United States Patent
Reytier et al.

(10) Patent No.: US 10,263,264 B2
(45) Date of Patent: Apr. 16, 2019

(54) METHOD FOR HIGH-TEMPERATURE ELECTROLYSIS OR CO-ELECTROLYSIS, METHOD FOR PRODUCING ELECTRICITY BY MEANS OF AN SOFC FUEL CELL, AND ASSOCIATED INTERCONNECTORS, REACTORS AND OPERATING METHODS

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Nicolas Bardi, Mirabel-les-echelles (FR); Charlotte Bernard, Contamine sur Arve (FR); Julie Mougin, Pontcharra (FR); Philippe Szynal, Chignin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 221 days.

(21) Appl. No.: 15/504,778

(22) PCT Filed: Aug. 11, 2015

(86) PCT No.: PCT/EP2015/068503
§ 371 (c)(1),
(2) Date: Feb. 28, 2017

(87) PCT Pub. No.: WO2016/026740
PCT Pub. Date: Feb. 25, 2016

(65) Prior Publication Data
US 2017/0279134 A1 Sep. 28, 2017

(30) Foreign Application Priority Data
Aug. 22, 2014 (FR) ...................................... 14 57944

(51) Int. Cl.
*H01M 8/04* (2016.01)
*H01M 8/04014* (2016.01)
(Continued)

(52) U.S. Cl.
CPC .......... *H01M 8/04014* (2013.01); *C25B 1/00* (2013.01); *C25B 1/08* (2013.01); *C25B 1/10* (2013.01);
(Continued)

(58) Field of Classification Search
CPC .......... H01M 8/04014; H01M 8/0267; H01M 8/04089; H01M 8/04156; H01M 8/0668;
(Continued)

(56) References Cited

U.S. PATENT DOCUMENTS 6,051,331 A    4/2000  Spear, Jr. et al.
6,106,967 A *  8/2000  Virkar ................... H01M 8/021
                                                                429/458
(Continued)

FOREIGN PATENT DOCUMENTS

DE    100 15 360 A1    10/2001
FR    3 000 108 A1     6/2014
(Continued)

OTHER PUBLICATIONS

International Search Report for corresponding International Patent Application No. PCT/EP2015/068503, dated Oct. 26, 2015.
(Continued)

*Primary Examiner* — Raymond Alejandro
(74) *Attorney, Agent, or Firm* — Jones Robb, PLLC

(57) ABSTRACT

A heat exchanger can be integrated into an interconnector that can be used in both a SOFC fuel cell and an EHT electrolyser, which allows a heat-transfer fluid different from that in the reactive and drainage gas circuits to be circulated from the inlet of the reactor, thereby allowing the best
(Continued)

Figure 1:
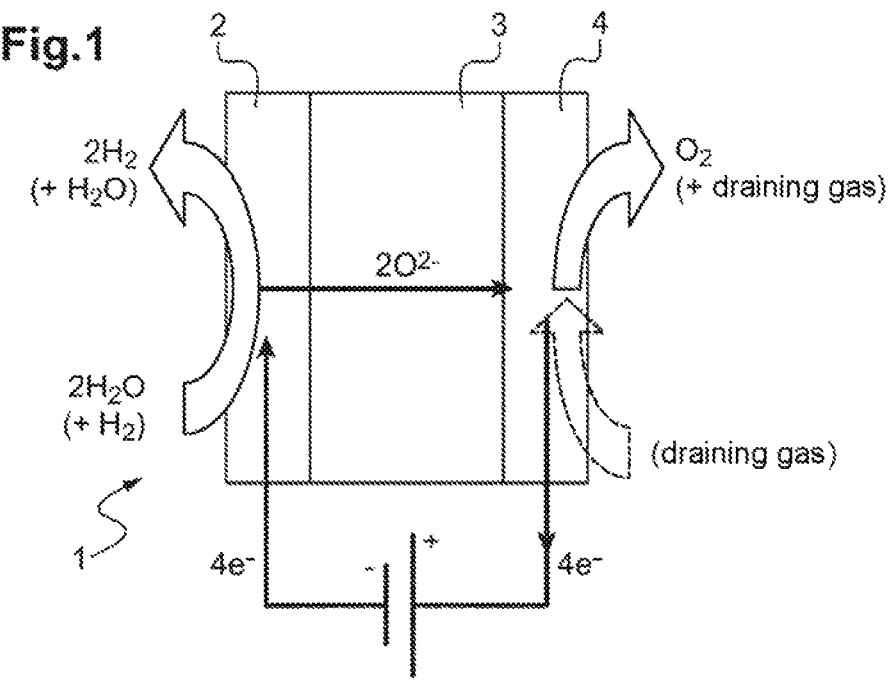

possible management of the exothermic operating modes of the SOFC cell and the exothermic or endothermic operating modes of the EHT electrolyser and the SOFC cell, especially in the absence of current for the latter.

22 Claims, 11 Drawing Sheets

(51) Int. Cl.
      C25B 1/00      (2006.01)
      C25B 1/08      (2006.01)
      C25B 9/04      (2006.01)
      C25B 9/20      (2006.01)
      F28F 9/02      (2006.01)
      F28D 9/00      (2006.01)
      H01M 8/0267      (2016.01)
      F28F 3/04      (2006.01)
      H01M 8/0668      (2016.01)
      H01M 8/04089      (2016.01)
      H01M 8/04119      (2016.01)
      C25B 1/10      (2006.01)
      C25B 9/18      (2006.01)
      C25B 15/02      (2006.01)
      F28D 21/00      (2006.01)
      H01M 8/124      (2016.01)

(52) U.S. Cl.
CPC ............... *C25B 9/045* (2013.01); *C25B 9/18* (2013.01); *C25B 9/20* (2013.01); *C25B 15/02* (2013.01); *F28D 9/005* (2013.01); *F28D 9/0093* (2013.01); *F28F 3/046* (2013.01); *F28F 9/026* (2013.01); *H01M 8/0267* (2013.01); *H01M 8/04089* (2013.01); *H01M 8/04156* (2013.01); *H01M 8/0668* (2013.01); *F28D 2021/0043* (2013.01); *F28F 2240/00* (2013.01); *H01M 2008/1293* (2013.01); *Y02E 60/366* (2013.01); *Y02P 20/132* (2015.11)

(58) Field of Classification Search
CPC .... H01M 2008/1293; C25B 1/08; C25B 1/10; C25B 9/045; C25B 9/18; C25B 15/02; F28D 9/005; F28D 9/0093; F28D 2021/0043; F28F 3/046; F28F 3/026; F28F 2240/00; Y02E 60/366
See application file for complete search history.

(56) References Cited

U.S. PATENT DOCUMENTS

| | | | |
|---|---|---|---|
| 8,500,971 B2 | 8/2013 | Le Gallo et al. | |
| 8,691,467 B2* | 4/2014 | Chatterjee | H01M 8/021 |
| | | | 429/468 |
| 2003/0064612 A1* | 4/2003 | England | F16J 15/102 |
| | | | 439/66 |
| 2004/0151975 A1 | 8/2004 | Allen | |
| 2007/0287047 A1 | 12/2007 | Kaiser et al. | |
| 2009/0134036 A1* | 5/2009 | Kodera | B23H 5/08 |
| | | | 205/264 |
| 2010/0200422 A1 | 8/2010 | Le Gallo et al. | |
| 2010/0266931 A1* | 10/2010 | Reytier | C25B 1/04 |
| | | | 429/508 |
| 2015/0333342 A1 | 11/2015 | Planque et al. | |

FOREIGN PATENT DOCUMENTS

| | | |
|---|---|---|
| GB | 2 151 840 A | 7/1985 |
| WO | 2009040335 A2 | 4/2009 |

OTHER PUBLICATIONS

Written Opinion of the International Search Authority for corresponding International Patent Application No. PCT/EP2015/068503, dated Oct. 26, 2015.

* cited by examiner

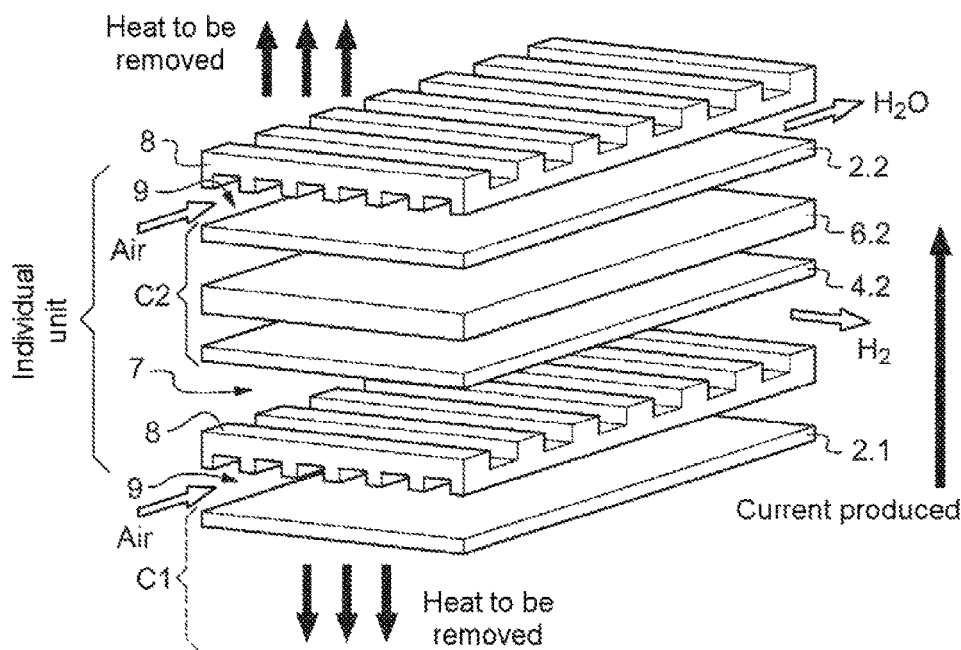
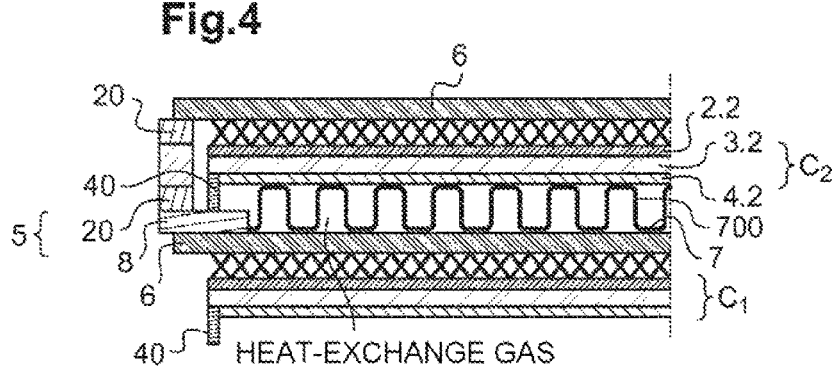

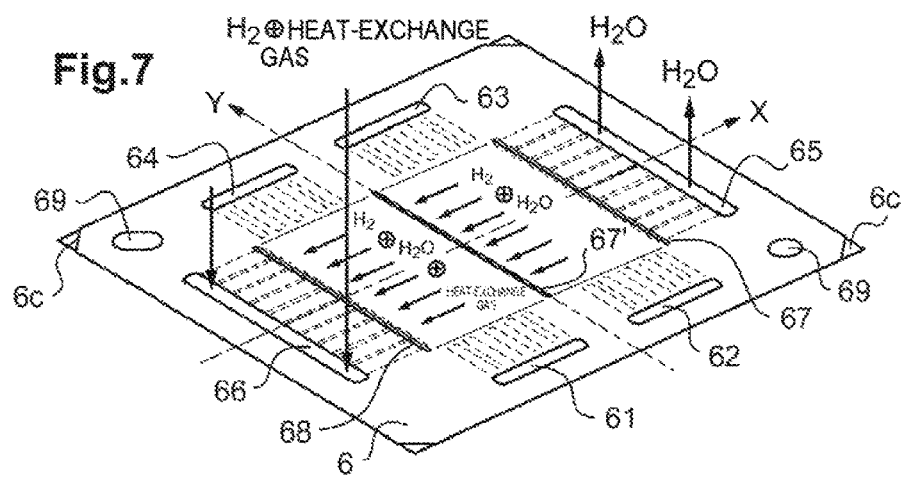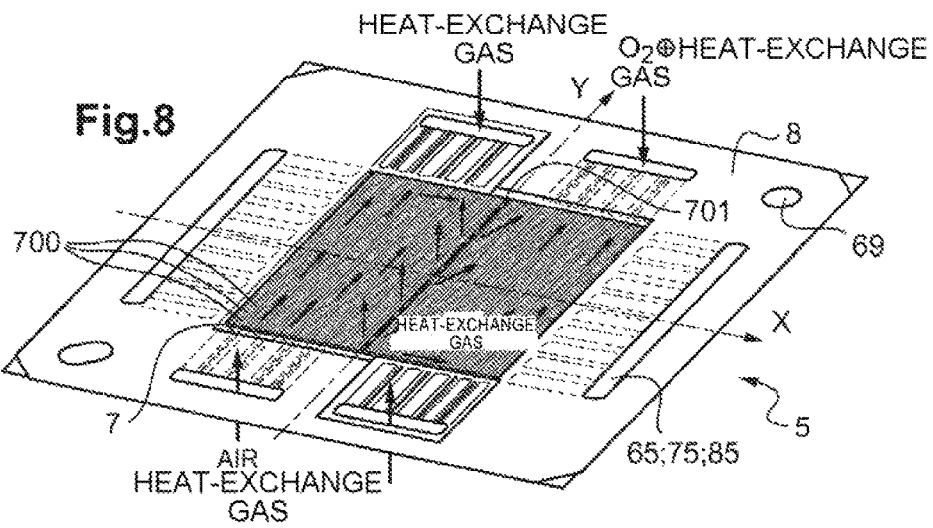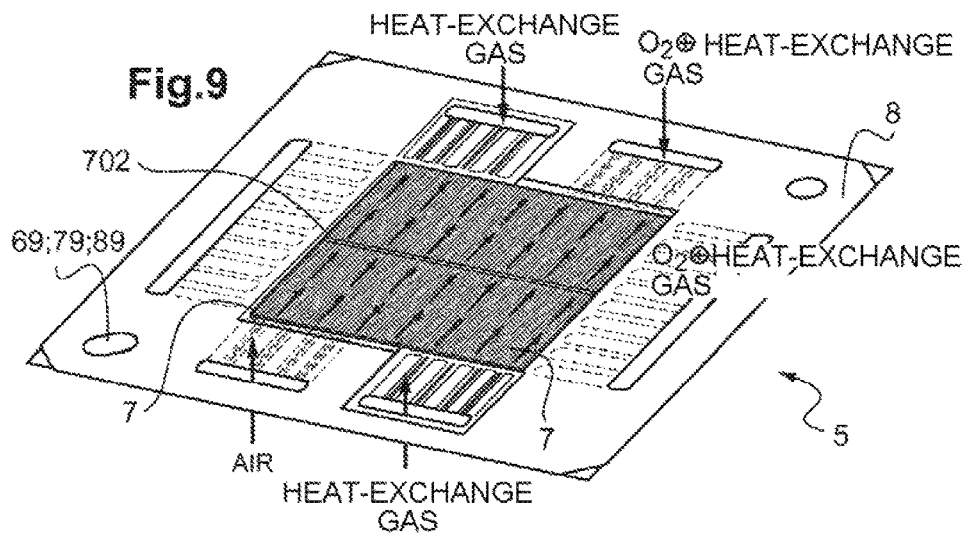

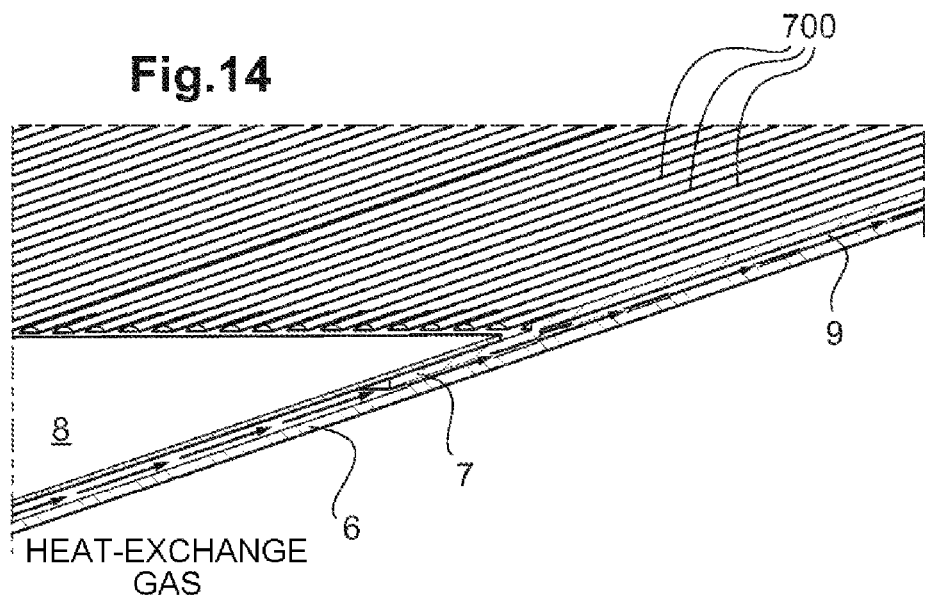
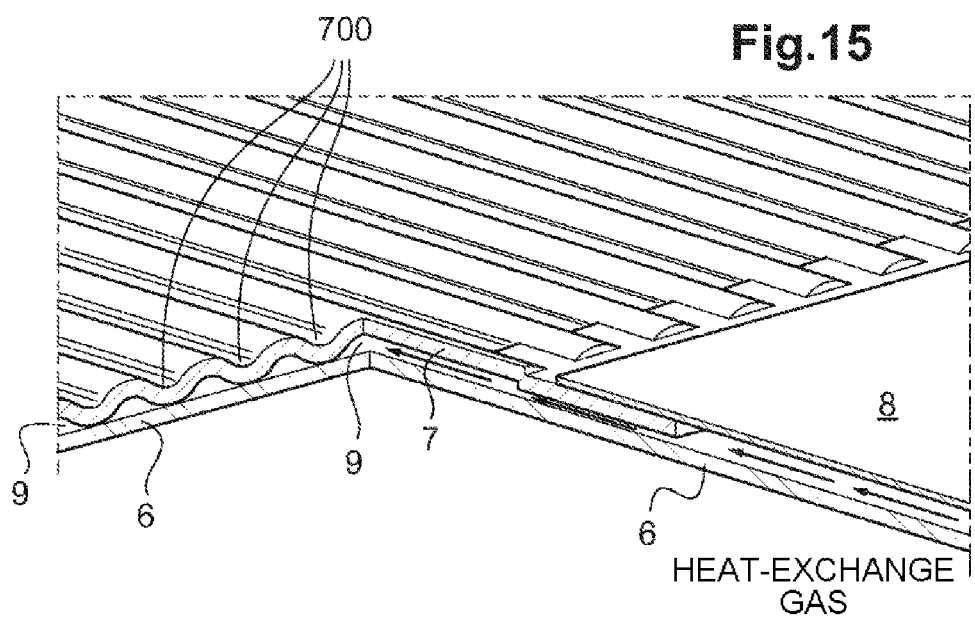

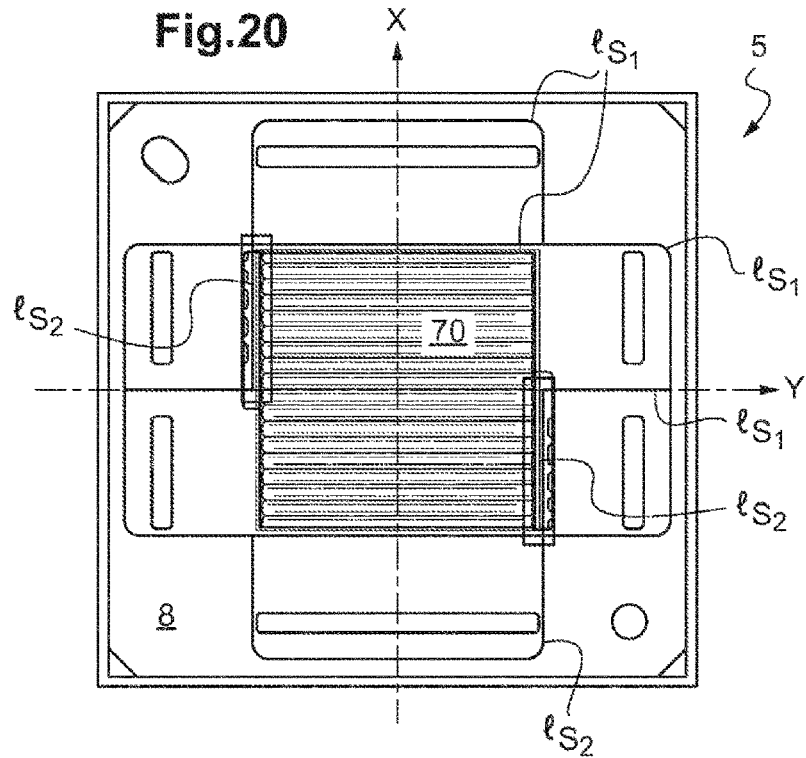
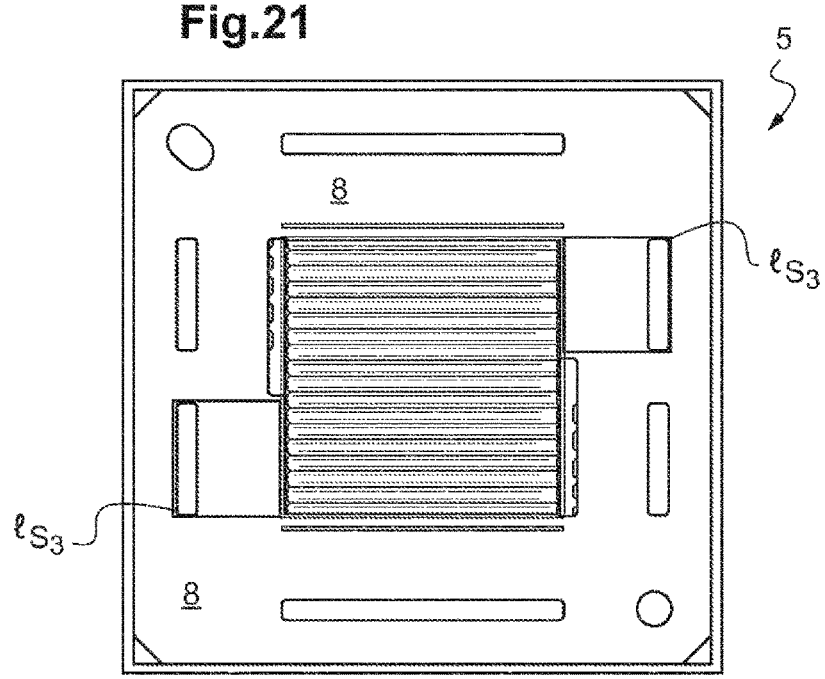

METHOD FOR HIGH-TEMPERATURE ELECTROLYSIS OR CO-ELECTROLYSIS, METHOD FOR PRODUCING ELECTRICITY BY MEANS OF AN SOFC FUEL CELL, AND ASSOCIATED INTERCONNECTORS, REACTORS AND OPERATING METHODS

This is a national stage application of PCT/EP2015/068503, filed internationally on Aug. 11, 2015, which claims priority to French Application No. FR 1457944, filed Aug. 22, 2014, the entire disclosures of each of which are incorporated herein by reference.

TECHNICAL FIELD

The present invention relates to the field of the high-temperature electrolysis of water or carbon dioxide $CO_2$ (HTE for High Temperature Electrolysis or also HTSE for High Temperature Steam Electrolysis) and of the co-electrolysis of water, also at high temperature, with carbon dioxide $CO_2$.

The present invention also relates to the field of solid oxide fuel cells (SOFCs).

The invention relates more particularly to a novel preparation of an electrical and fluidic interconnector within a high-temperature electrolysis or co-electrolysis (HTE) reactor or an SOFC cell comprising a stack of individual electrochemical cells, in which a separate heat-exchange circuit is incorporated.

It is specified here that electrical and fluidic interconnection devices, also known as interconnectors or even interconnection plates, are devices which provide the in series connection, from an electrical viewpoint, of each individual electrochemical cell in the stack of the HTE reactors or SOFC cells and the in parallel connection, from a fluidic viewpoint, thus combining the production of each of the individual cells. The interconnectors thus provide the functions of introducing and collecting current and delimit compartments for the circulation (distribution and/or collection) of the gases.

PRIOR ART

In order to carry out the electrolysis of water, it is advantageous to carry it out at high temperature, typically between 600 and 950° C., as a portion of the energy necessary for the reaction may be contributed by the heat, which is cheaper than the electricity, and the activation of the reaction is more effective at high temperature and does not require a catalyst.

In order to carry out the electrolysis at high temperature, it is known to use an electrolyzer of SOEC (Solid Oxide Electrolyte Cell) type, consisting of a stack of individual units each comprising an individual solid oxide electrolyte cell consisting of three anode/electrolyte/cathode layers superimposed on one another and of interconnection plates made of metal alloys, also known as bipolar plates, or interconnectors. A solid oxide fuel cell (SOFC) consists of the same type of stack of individual units.

The role of the interconnectors is to provide both the passage of the electrical current and the circulation of the gases in the vicinity of each individual cell (steam injected, hydrogen and oxygen extracted in an HTE electrolyzer, air and fuel, including hydrogen, injected and water extracted in an SOFC cell) and to separate the anode and cathode compartments, which are the compartments for circulation of the gases respectively on the side of the anodes and cathodes of the individual cells.

In order to carry out the high-temperature steam electrolysis HTE, steam $H_2O$ is injected into the cathode compartment. Under the effect of the current applied to the cell, the disassociation of the water molecules in the vapor form is carried out at the interface between the hydrogen electrode (cathode) and the electrolyte: this dissociation produces molecular hydrogen $H_2$ gas and oxygen ions. The molecular hydrogen is collected and discharged at the hydrogen compartment outlet. The oxygen ions $O^{2-}$ migrate through the electrolyte and recombine to give molecular oxygen at the interface between the electrolyte and the oxygen electrode (anode). A draining gas, such as air, may circulate at the anode and thus collect the oxygen generated in the gaseous form at the anode.

In order to ensure the operation of an SOFC fuel cell, air (oxygen) is injected into the cathode compartment of the cell and hydrogen is injected into the anode compartment. The oxygen of the air will dissociate to give $O_2^-$ ions. These ions will migrate in the electrolyte of the cathode toward the anode in order to oxidize the hydrogen and to form water with simultaneous production of electricity. In the SOFC cell, just as in SOEC electrolysis, the steam is found in the $H_2$ compartment.

As the operating conditions for an HTE eletrolyzer are very similar to those of an SOFC fuel cell, the same technological constraints are encountered, namely mainly the mechanical strength at the temperatures and thermal cyclings of a stack of different materials (ceramics and metal alloy), the maintenance of the leaktightness between the anode and cathode compartments, the resistance to aging of the metal interconnectors and the minimization of the ohmic losses at various interfaces of the stack.

An important constraint is to manage as best as possible the thermal operating conditions of a fuel cell (SOFC), within which the overall reaction is exothermic, or of an electrolyzer (HTE), where the overall reaction may be either exothermic or endothermic, depending on the operating potential.

In particular, for an exothermic reaction of a HTE electrolyzer, it is necessary to remove the heat produced in order to provide a stationary state of the electrolyzer. The removal of the heat then takes place either by the gases exiting from the electrolyzer or by radiation over the edges.

In some already well-tried electrolyzers, this removed heat is used to heat the incoming gases by heat exchange in an external exchanger positioned upstream of the electrolyzer.

In point of fact, the internal elements of the electrolyzer, in particular the individual cells, are at least partially made of ceramic; these elements are thus very sensitive to temperature gradients and are not capable of withstanding a thermal shock, that is to say a high temperature difference, typically of greater than 50° C. This thus implies reducing as much as possible the difference in temperature between that of the incoming gases and that of the gases exiting from the anode and cathode compartments, typically to a value of less than or equal to 50° C.

Furthermore, in order to ensure the longevity of the electrolyzer and the satisfactory operation thereof, it is preferable to provide a distribution of the temperature within the electrolyzer which is as homogeneous as possible. The aim is typically to have temperatures not varying by more than 10° C. throughout the stack.

In order to prevent these thermal shocks as indicated above, a heat exchanger is used upstream of the electrolyzer.

In point of fact, as a result of the inevitable heat losses between the outlet of the electrolyzer and the inlet of the exchanger and the pinch of the exchanger, there is a difference of at least 50° C. between the temperature of the incoming gases and that of the exiting gases.

This thus requires having an exiting gas temperature which is greater than that required for the incoming gases. In point of fact, this difference in temperature between the incoming and exiting gases is unfavorable to the search for a homogeneous temperature in the electrolyzer.

In addition, this higher temperature is harmful to the mechanical strength of the individual cells. This thus requires a choice of specific materials; above a temperature of 700° C., the appropriate materials are few and their cost price is high.

Furthermore, as heat is recovered with regard to the gases resulting both from the anode and from the cathode, two exchangers with a high-temperature stage are required. The presence of high-temperature connections between the electrolyzer and the exchangers also increases the cost and the difficulties of intervention and of maintenance with regard to the exchangers.

Finally, the overall plant is of increased size and weight.

In order to overcome these disadvantages, the applicant company provided, in the patent application WO 2009/040335, for the incorporation of a heat exchanger within each interconnector, the circuits of the heat-exchange fluids provided being that of the steam. Thus, with the exchanger provided, the steam, before its contact with the cathodes for the electrolysis reaction proper, undergoes a passage inside the interconnector and is thus heated beforehand.

While the solution provided makes it possible to improve the operation of an electrolyzer in comparison with the solutions according to the state of the art already provided, it exhibits numerous disadvantages which may be listed as follows.

First of all, the heat-exchange fluid injected at the anode, as draining gas, after its passage in the gap plate may only be water and not air. Specifically, owing to the fact that the heat-exchange fluid also has to be used to produce leaktightnesses, it is necessary to inject steam $H_2O$, everywhere in excess pressure with respect to the reaction products, in order to prevent any mixing between the hydrogen $H_2$ produced and the oxygen $O_2$ produced.

Subsequently, when the interconnector is used with the exchanger provided for an HTE electrolyzer, owing to the fact that, from the inlet of the reactor, the heat-exchange fluid is also the reactive gas (steam), implies that the thermal conditions and the degree of conversion, that is to say the degree of progression of the reaction (steam to give hydrogen), are coupled. In other words, if the thermal operating conditions are acted on, by modifying the flow rate of the reactive gas injected into the reactor, the degree of conversion is consequently acted on.

This is thus harmful to the flexibility of use of the HTE electrolyzer, the interconnectors of which incorporate an exchanger, as according to WO 2009/040335.

Equally, the interconnector with exchanger provided according to WO 2009/040335 is made of two embossed plates, which implies a leaktightness behavior difficult to achieve due to the very reliefs of the plates.

In an SOFC fuel cell, the reaction is generally highly exothermic. In order to limit the temperature gradient in the stack, without harming the rate of use of fuel, the only possible variable for adjustment is the air flow rate, which is thus generally increased with respect to the requirements of the electrochemical reaction. This is damaging to the yield since it is necessary to increase the amount of air to be compressed upstream of the fuel cell.

Still as SOFC fuel cell, thermal systems incorporated within the stack have already been provided. Mention may be made here of the thermal system provided in the patent application GB 2 151 840 A, in which rows of coiled cooling pipes supported by a plate come to be inserted each within the stack. Besides the fact that the system provided is harmful to the compactness of the SOFC cell, the cooling disclosed may not be homogeneous since the rows of pipes provided are not inserted between two consecutive individual units each consisting of an interconnector and an individual cell but only every five units in the stack.

Furthermore, in the field of acid membrane electrolysis, generally known under the acronym PEM for Proton-Exchange Membrane, there is known patent application DE10015360A1, which has provided for the incorporation of an exchanger comprising a heat-exchange liquid within an interconnector comprising two embossed plates.

Such an interconnector with exchanger may not be envisaged for an HTE or SOFC application as neither the heat-exchange liquid nor the sealing silicone of the circuit of the heat-exchange fluid are capable of withstanding the high temperatures in HTE/SOFC.

In addition, just as for the interconnector with exchanger provided according to WO 2009/040335, the interconnector according to this application is produced using two embossed plates, which makes it problematic to obtain the leaktightness behavior.

There exists a need to improve the management of the thermal operating conditions of an HTE electrolyzer and of an SOFC fuel cell, in particular in order to decouple them, that is to say to render them independent of the degree of conversion of the reactive gas or gases (steam for the HTE, oxygen and fuel for the SOFC cell), to be freed from the need for compression of a high air flow rate upstream and in order not to harm the leaktightness behavior as a result of reliefs of the embossed plates of the interconnectors, or the compactness of the HTE electrolyzer or of the SOFC cell.

One aim of the invention is to meet this need at least in part.

Account of the Invention

In order to do this, the invention relates, under one of its aspects, according to a first alternative, to a process for the high-temperature electrolysis of steam $H_2O$ or respectively for the high-temperature electrolysis of carbon dioxide ($CO_2$) or respectively for the high-temperature co-electrolysis with carbon dioxide ($CO_2$), carried out in a reactor comprising a stack of individual electrolysis cells of SOEC type each formed of a cathode, of an anode and of an electrolyte inserted between the cathode and the anode and a plurality of electrical and fluidic interconnectors each arranged between two adjacent individual cells with one of its faces in electrical contact with the anode of one of the two individual cells and another of its faces in electrical contact with the cathode of the other of the two individual cells. According to this first alternative of the invention, the following stages are carried out simultaneously:

a/ steam or respectively carbon dioxide $CO_2$ or respectively steam mixed with carbon dioxide $CO_2$ are supplied and distributed, and the hydrogen ($H_2$) produced or respectively the carbon monoxide (CO) produced or respectively the hydrogen and the carbon monoxide CO which are produced and, if appropriate, the steam or respectively the carbon dioxide $CO_2$ or respectively the steam and the carbon dioxide $CO_2$ in surplus are recovered at each cathode of the individual cells, b/ a draining gas, such as air, is supplied and distributed and the draining gas and the oxygen ($O_2$) produced are recovered at each anode of the individual cells, c/ a heat-exchange gas capable of introducing or removing heat is supplied and distributed within each interconnector at each individual cell, stage c/ being carried out from the inlet of the reactor in a circuit separate from that of the draining gas and of the oxygen $O_2$ produced and separate from that of the hydrogen $H_2$ produced or respectively from that of the carbon monoxide produced or respectively from that of the hydrogen and carbon monoxide which are produced, either up to the outlet of the reactor or up to at least one first region upstream of the outlet of the reactor, in which the heat-exchange gas is mixed with the hydrogen produced upstream or respectively with the carbon monoxide produced upstream or respectively with hydrogen and carbon monoxide which are produced upstream and, if appropriate, with the steam or respectively the carbon dioxide $CO_2$ or respectively the steam and the carbon dioxide $CO_2$ in surplus, or up to at least one second region upstream of the outlet of the reactor, in which the heat-exchange gas is mixed with the oxygen produced and the draining gas, or up to both at least the first upstream region and the second upstream region.

According to one embodiment, when the heat-exchange gas is chemically neutral with regard to hydrogen and oxygen, stage c/ may be carried out either up to the outlet of the reactor, or up to the first upstream region and/or the second upstream region.

According to another embodiment, when the heat-exchange gas does not react with hydrogen, stage c/ may be carried out either up to the outlet of the reactor, or only up to the first upstream region.

According to another embodiment, when the heat-exchange gas does not react with oxygen, stage c/ may be carried out either up to the outlet of the reactor, or only up to the second upstream region.

According to an alternative embodiment, when the heat-exchange gas is mixed with the hydrogen produced upstream or respectively carbon monoxide produced upstream or respectively with hydrogen and carbon monoxide which are produced upstream of the first region, it may be chosen from carbon dioxide ($CO_2$), hydrogen ($H_2$), carbon monoxide (CO), steam ($H_2O$) or mixtures of these.

According to this other alternative form, the process is a co-electrolysis process, the carbon dioxide as heat-exchange gas being mixed with the steam and the hydrogen produced from the first upstream region.

According to another alternative embodiment, when the heat-exchange gas is mixed with the oxygen produced upstream of the second region and the draining gas, it may be chosen from air, oxygen ($O_2$) or a mixture of these.

According to one embodiment, operating conditions in exothermic mode are defined for the electrolysis or respectively the co-electrolysis of the steam at the cathodes of the individual cells, the heat given off by the electrolysis or respectively the co-electrolysis being removed by the heat-exchange gas.

According to another embodiment, operating conditions in endothermic mode are defined for the electrolysis or respectively the co-electrolysis of the steam at the cathodes of the individual cells, the heat absorbed by the electrolysis or respectively the co-electrolysis being contributed by the heat-exchange gas.

The invention also relates, according to a second alternative, to a process for the high-temperature production of electricity carried out in a solid oxide fuel cell (SOFC) comprising a stack of individual electrochemical cells inserted between the cathode and the anode, and a plurality of electrical or fluidic interconnectors each arranged between two adjacent individual cells with one of its faces in electrical contact with the anode of one of the two individual cells and the other of its faces in electrical contact with the cathode of the other of the two individual cells.

According to the second alternative, the following stages are carried out simultaneously:

a1/ air and/or oxygen ($O_2$) are supplied and distributed, and the surplus air and/or oxygen ($O_2$) are recovered at each cathode of the individual cells, b1/ a fuel is supplied and distributed, and the water and/or the carbon dioxide ($CO_2$) which is (are) produced and, if appropriate, the surplus fuel are recovered at each anode of the individual cells, c1/ a heat-exchange gas capable of removing the heat produced at each individual cell is supplied and distributed within each interconnector, stage c1/ being carried out in a circuit separate from that of the water and/or of the carbon dioxide ($CO_2$) which is (are) produced and, if appropriate, of the surplus fuel and separate from that of the air and/or of the oxygen ($O_2$), either up to the outlet of the reactor, or up to at least one first region upstream of the outlet of the reactor, in which the heat-exchange gas is mixed with the water and/or the carbon dioxide ($CO_2$) which is (are) produced upstream and, if appropriate, the surplus fuel, or up to at least one second region upstream of the outlet of the reactor, in which the heat-exchange gas is mixed with the air and/or the oxygen ($O_2$) originating from the upstream side.

According to one embodiment, when the heat-exchange gas is a fuel, stage c1/ may be carried out either up to the outlet of the reactor, or only up to the first upstream region. According to this embodiment and according to an alternative embodiment, when the heat-exchange gas is mixed with the water and/or the carbon dioxide ($CO_2$) which is (are) produced upstream and, if appropriate, the surplus fuel, it may be chosen from hydrogen, steam ($H_2O$), carbon dioxide ($CO_2$), methane ($CH_4$), carbon monoxide (CO) or mixtures of these.

According to another embodiment, when the gas is an oxidant, stage c1/ may be carried out either up to the outlet of the reactor, or only up to the second upstream region. According to this other embodiment and according to an alternative embodiment, when the heat-exchange gas is mixed with the air and/or oxygen ($O_2$) originating from the upstream side of the second region, it may be chosen from air, air not depleted in oxygen, oxygen or mixtures of these.

In other words, the process according to the invention consists essentially in providing a heat-exchange fluid circuit incorporated within an interconnector for an HTE electrolyzer or SOFC fuel cell which is separate from each of the circuits of the reactive gas or gases or of the draining gas which comes into contact with an anode or a cathode of the stack of individual cells since it is not desired to introduce the heat-exchange fluid at the anode or cathode inlet.

Thus, it is possible to adjust as best as possible the flow rate and the temperature of the heat-exchange fluid in order to manage the operating conditions, either exothermic for HTE and for the SOFC cell or endothermic for the HTE as for the SOFC cell, in particular in the absence of current for the latter, without this necessarily influencing the targeted degree of conversion.

It is possible all the same to advantageously choose a heat-exchange fluid which is a reactive gas in order to inject it as desired into a region or several regions upstream of the outlet of the HTE reactor or of the SOFC cell, in order to optimize the targeted reaction, namely respectively the electrolysis or co-electrolysis of the steam or the production of electricity by oxidation of a fuel to give water. It is thus advantageously possible to increase the degree of conversion to give hydrogen without excessively greatly decreasing or increasing the temperature within the HTE electrolyzer. The heat-exchanger injection of the different individual cells in the stack may make it possible to supply them with reactive gases with different flow rates, which may be advantageous during the aging of all the individual cells.

The invention also relates, under another of its aspects, to a device forming an electrical and fluidic interconnector for the high-temperature electrolysis of steam (HTE) high-temperature co-electrolysis with carbon dioxide $CO_2$, or an SOFC fuel cell, the device consisting of three metal sheets, extended along two axes of symmetry (X, Y) orthogonal to one another, one of the end metal sheets being intended to come into mechanical contact with the plane of a cathode of an individual electrochemical cell and another of the metal sheets being intended to come into mechanical contact with the plane of an anode of an adjacent individual electrochemical cell, each of the two adjacent individual electrochemical cells of SOEC type being formed of a cathode, of an anode and of an electrolyte inserted between the cathode and the anode.

In this device according to the invention:

one of the three metal sheets, referred to as central metal sheet, comprises an embossed central part comprising embossed features defining channels and is pierced, at the periphery of its central part, with at least six ports, the first to fourth ports being extended each over a length corresponding to a portion of the length of the central part along one of the axes X and being distributed in pairs on either side of said axis X, whereas the fifth and sixth ports are extended each over a length corresponding substantially to the length of the central part along the other of the axes Y, one of the end metal sheets, referred to as first end metal sheet, being a flat metal sheet comprising a central part and the first end metal sheet being pierced, at the periphery of its central part, with at least six ports, the first to fourth ports being extended each over a length corresponding to a portion of the length of the central part of the first end metal sheet along one of the axes X and being distributed in pairs on either side of said axis X, whereas the fifth and sixth ports are extended each over a length corresponding substantially to the length of the central part of the first end metal sheet along the other of the axes Y, the central part being pierced with at least two slits extended each over a length corresponding substantially to the length of the central part of the first end metal sheet along the other of the axes Y, the other of the end metal sheets, referred to as second end metal sheet, being a flat metal sheet comprising a hollowed-out central part and is pierced, at the periphery of its central part, with at least six ports, the first to fourth ports being extended each over a length corresponding to a portion of the length of the central part of the second end metal sheet along one of the axes X and being distributed in pairs on either side of said axis X, whereas the fifth and sixth ports are extended each over a length corresponding substantially to the length of the central part of the second end metal sheet along the other of the axes Y, the six ports of the central metal sheet each comprise tongues of steel sheets spaced out from one another, forming a comb, and each comprise slits defined between the edge of one of the ports and a tongue or between two consecutive tongues.

In this interconnector according to the invention, the three metal sheets are laminated and assembled together such that:

each of the first to sixth ports of one of the three metal sheets is in fluidic communication individually respectively with one of the corresponding first to sixth ports of the other two metal sheets, the first port of the central metal sheet is in fluidic communication with the third port of the central metal sheet via the spaces between tongues of the first port, the channels defined by the embossed features and the spaces between tongues of the third port of the central metal sheet, the second port of the central metal sheet is in fluidic communication with the fourth port of the central metal sheet via the spaces between tongues of the second port of the central metal sheet, the interior chamber delimited between the embossed features and the flat central part of the first end metal sheet and the spaces between tongues of the fourth port of the central metal sheet, the fifth port and the sixth port of the first end metal sheet are in fluidic communication with one of the slits and respectively the other of the slits of the first end metal sheet via the spaces between tongues of the fifth port and respectively the sixth port of the central metal sheet.

"Port" is understood to mean, here and in the context of the invention, a hole emerging on either side of a metal sheet.

By virtue of such an interconnector, which may be used both in a fuel cell SOFC and in an HTE electrolyzer, it is possible to circulate, from the inlet of the reactor, a heat-exchange fluid separate from the circuits of reactive gases and of draining gas, which makes it possible to manage as best as possible the exothermic operating conditions of the SOFC battery and the operating conditions, either exothermic or endothermic, of the HTE electrolyzer.

In an interconnector according to the invention, the end metal sheets, which are those which contribute to the resistance of the seals to high temperatures, typically at 800° C., are flat, all the reliefs being produced by embossing in the central metal sheet. Thus, according to the invention, an exchanger is incorporated actually within a thin interconnector while guaranteeing flat regions on the interconnector between the manifolds (ports for introducing and recovering the gases) and an electrochemical cell, which makes it possible to promote the resistance of the glass seals to high temperature.

The fact that the two end metal sheets are flat makes it possible to envisage varying their thickness, for issues of stiffness or of height of passage of gas on the $O_2$ side, if need be, without modifying the stiffness of the electrical contact. In other words, it is possible to carry out a thinning of these end metal sheets, which is also advantageous in terms of supplying and/or of costs.

Finally, according to the position of the individual electrochemical cell, it may be necessary to vary the flow rate of the heat-exchange fluid, for example a great flow rate at the centre of the stack and a low flow rate on the edges, which may be easily done by adjusting the number of passage tongues for the heat-exchange fluid.

According to a first advantageous embodiment, the first end metal sheet additionally comprises one or more extended third slit(s) over a length corresponding substantially to the length of the central part along the other of the axes Y, the third slit(s) being arranged between the other two slits of the first end metal sheet, the three metal sheets are assembled together such that the extended third slit(s) of the first end metal sheet is (are) in fluidic communication with the interior chamber.

According to a second advantageous embodiment:

the central metal sheet additionally comprises one or more extended slit(s) over a length corresponding substantially to the length of the central part along the other Y of the axes, the slit(s) being arranged along an embossed channel, the three metal sheets are assembled together such that the extended slit(s) of the central metal sheet is (are) in fluidic communication with the interior chamber.

According to a third advantageous embodiment:

the central metal sheet additionally comprises one or more extended slit(s) over a length corresponding substantially to the length of the central part along the other Y of the axes, the slit(s) being arranged transversely to the embossed channels, the three metal sheets are assembled together such that the extended slit(s) of the central metal sheet is (are) in fluidic communication with the interior chamber.

In other words, the heat-exchange fluid may be injected into a region downstream of the inlet of the reactor, that is to say downstream of the beginning of the electrolysis or co-electrolysis reaction for the HTE or the oxidation reaction of the fuel for the SOFC cell, which makes it possible to manage both the thermics and the mixing of gases along the route to an individual cell.

As advantageous example, it is thus possible to enrich, in $O_2$, the SOFC cathode in a region close to the outlet in an SOFC cell or in $H_2O/CO_2$ mixture in a region close to the cathode outlet in co-electrolysis.

As equally advantageous example, it is possible to envisage injecting methane ($CH_4$) during the SOFC anode side reaction: thus, if the fuel cell is supplied with gas resulting from reforming, the reaction may be highly exothermic at the inlet of electrochemical cells, and a first injection of cold methane as heat-exchange fluid at the inlet of the individual cells makes it possible to cool the latter, and then a second injection of methane downstream in a region of the cell where the water produced is already present also makes it possible to cool while avoiding a harmful carbon deposition.

The injection of the heat-exchange gas may be differentiated according to the location in the stack of individual cells by modifying the pressure drops introduced by the tongues of the central metal sheet. Advantageously, it is thus possible to inject a heat-exchange fluid into the $H_2/H_2O$ compartments; this may also make it possible to supply the individual cells with different flow rates and present an advantage during aging.

The fact of having several ports by which it is possible to precisely inject, at the anode or the cathode of an individual cell, the heat-exchange fluid in several regions makes it possible to better distribute the flow rates and to control the composition of the gas all along the individual cell.

Preferably, the three metal sheets are assembled together by welding or by brazing, more preferably by weld seams (ls) individually closed around each fluidic communication.

Preferably, the three metal sheets are made of ferritic steel comprising approximately 20% of chromium, preferably made of Crofer® 22APU, or FT18TNb based on nickel of Inconel® 600 or Haynes® type. Each of the three metal sheets preferably has a thickness of between 0.05 and 1 mm.

According to an advantageous alternative form, the tongues of the second port of the central metal sheet and the tongues of the fourth port of the central metal sheet are embossed over at least a portion of their length, their embossed features being supported against the peripheral part of the first end metal sheet. The embossed parts of these tongues make it possible to guarantee the spacing of the metal sheets in this region and thus facilitate the passage of the heat-exchange fluid under the central metal sheet in order for it to arrive at the heat exchange region.

Preferably, the three metal sheets are pierced at their periphery with additional ports suitable for housing fixing rods.

The invention relates, under yet another of its aspects, to an electrolysis or co-electrolysis reactor comprising a stack of individual solid oxide electrochemical cells each formed of a cathode, of an anode and of an electrolyte inserted between the cathode and the anode, and a plurality of electrical and fluidic interconnectors which have just been described, each arranged between two adjacent individual cells with the first end metal sheet in electrical contact with the cathode of one of the two individual cells and the embossed features of the central metal sheet with the anode of the other of the two individual cells.

The invention also relates to a process for the operation of such an electrolysis reactor, according to which:

the first ports are supplied with draining gas, such as air and/or oxygen ($O_2$), and simultaneously the second ports are supplied with a heat-exchange gas capable of removing or introducing heat, the heat-exchange gas being chemically neutral with regard to hydrogen, the fifth ports are supplied with steam and/or with hydrogen, the hydrogen produced by the electrolysis of the steam and, if appropriate, the gas produced by the co-electrolysis of the steam and of the heat-exchange gas introduced by the third slit(s) of the first end metal sheet are recovered in the sixth ports and simultaneously the heat-exchange gas is recovered in the fourth ports and simultaneously the oxygen produced by the electrolysis of the steam and if appropriate by the co-electrolysis is recovered in the third ports.

The invention also relates to the process for the operation of such an electrolysis reactor, in which:

the first ports are supplied with draining gas, such as air and/or oxygen ($O_2$), and simultaneously the second ports are supplied with a heat-exchange gas capable of removing or introducing heat, the heat-exchange gas being chemically neutral with regard to oxygen, the fifth ports are supplied with steam and/or with hydrogen, the hydrogen produced by the electrolysis of the steam and, if appropriate, the gas produced by the co-electrolysis of the steam and the heat-exchange gas introduced by the extended slit(s) of the central metal sheet are recovered in the sixth ports and simultaneously the heat-exchange gas is recovered in the fourth ports and simultaneously the oxygen produced by the electrolysis of the steam and if appropriate by the co-electrolysis is recovered in the third ports.

The invention relates, under yet another aspect, to a fuel cell (SOFC) comprising a stack of individual solid oxide electrochemical cells each formed of an anode, of a cathode and of an electrolyte inserted between the cathode and the anode, and a plurality of electrical and fluidic interconnectors described above, each arranged between two adjacent individual cells with the first end metal sheet in electrical contact with the anode of one of the two individual cells and the embossed features of the central metal sheet with the cathode of the other of the two individual cells.

The invention also relates to a process for the operation of such a fuel cell (SOFC), according to which:

the first ports are supplied with air and/or with oxygen and, simultaneously, the second ports are supplied with a heat-exchange gas capable of removing heat, the heat-exchange gas additionally being a fuel, the fifth ports are supplied with fuel, the water and/or the carbon dioxide ($CO_2$) which is (are) produced and, if appropriate, the surplus fuel and, if appropriate, the heat-exchange gas introduced by the slit(s) of the end metal sheet are recovered in the sixth ports and simultaneously the heat-exchange gas is recovered in the fourth ports and simultaneously the air and/or the oxygen is/are recovered in the third ports.

Finally, the invention relates to a process for the operation of such a fuel cell (SOFC), according to which:

the first ports are supplied with air and/or with oxygen and simultaneously the second ports are supplied with a heat-exchange gas capable of removing heat, the heat-exchange gas additionally being an oxidant, the fifth ports are supplied with fuel, the water and/or the carbon dioxide ($CO_2$) which is (are) produced and, if appropriate, the surplus fuel and, if appropriate, the heat-exchange gas introduced by the slit(s) of the central metal sheet are recovered in the sixth ports and simultaneously the heat-exchange gas is recovered in the fourth ports and simultaneously the air and/or the oxygen is/are recovered in the third ports.

The invention is advantageously carried out with stacks of individual electrochemical cathode-supported cells.

"Cathode-supported cell" is understood, here and in the context of the invention, to have the definition already given in the field of high-temperature water electrolysis HTE and denoted under the acronym CSC, that is to say an individual cell in which the electrolyte and the oxygen electrode (anode) are positioned on the thicker hydrogen or carbon monoxide electrode (cathode), which thus acts as support.

DETAILED DESCRIPTION

Figure 2:
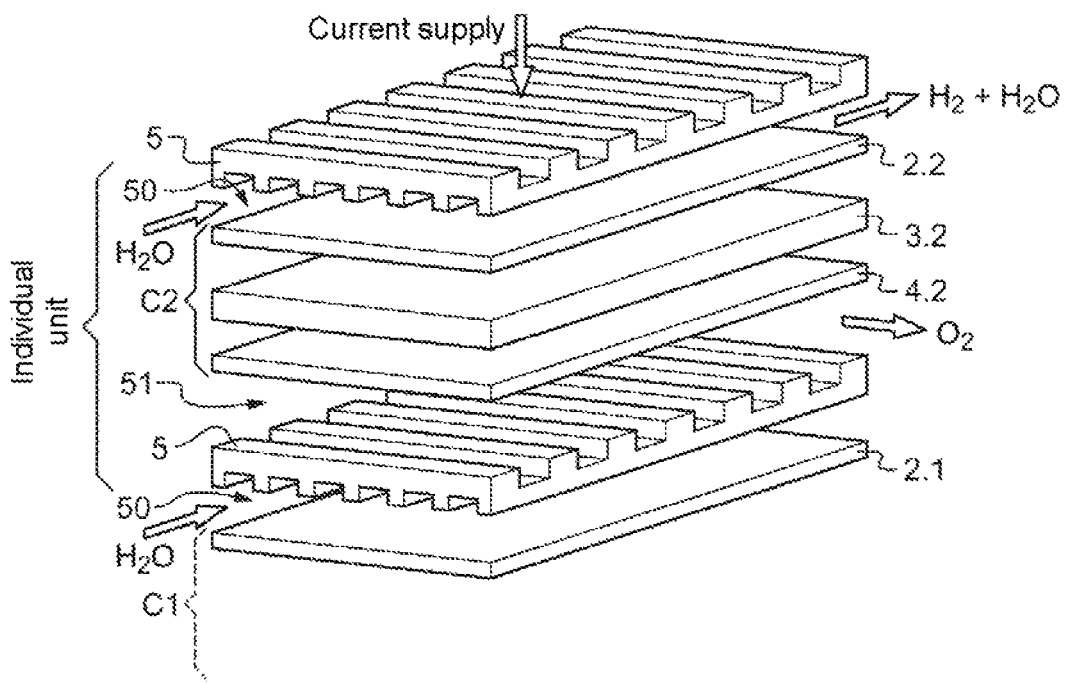
Figure 5:
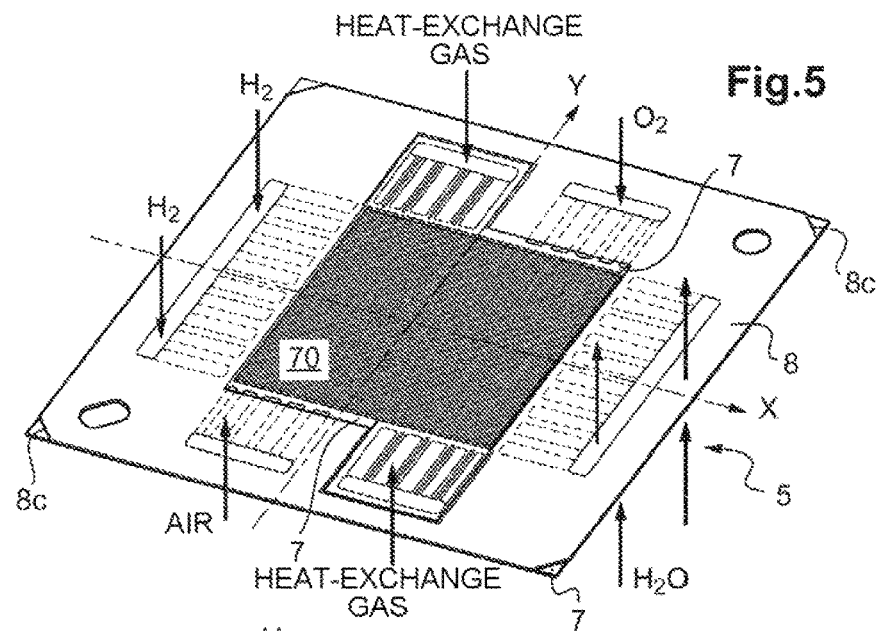
Figure 6:
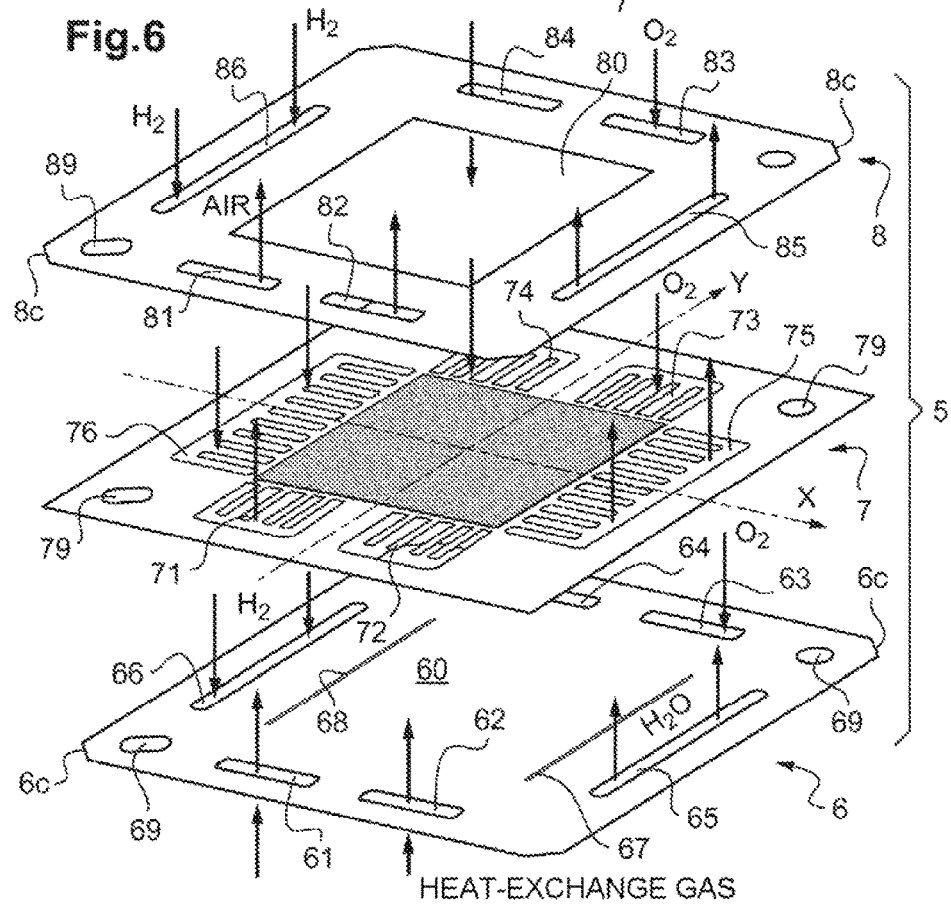
Figure 10A:
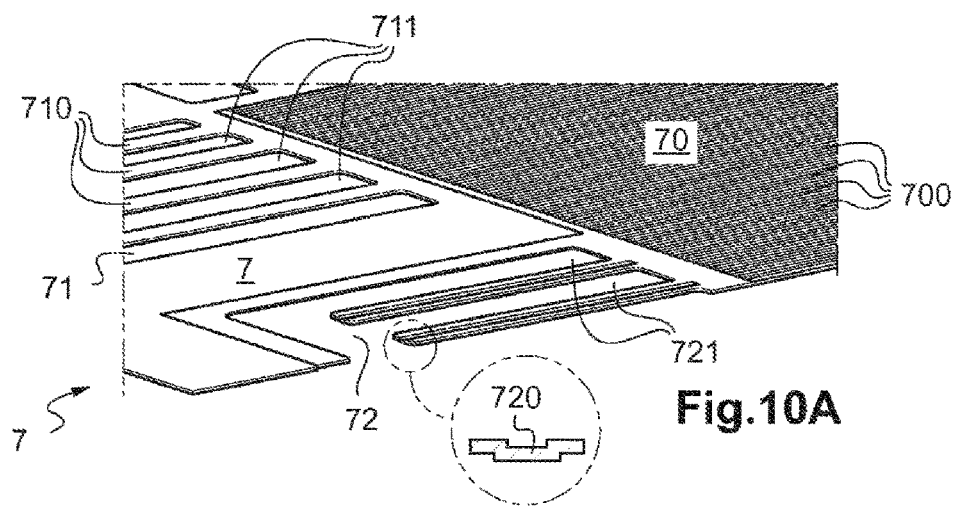
Figure 10B:
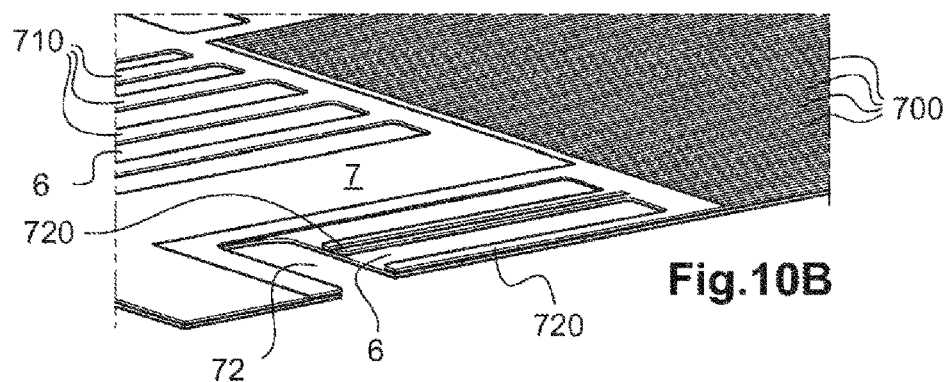
Figure 10C:
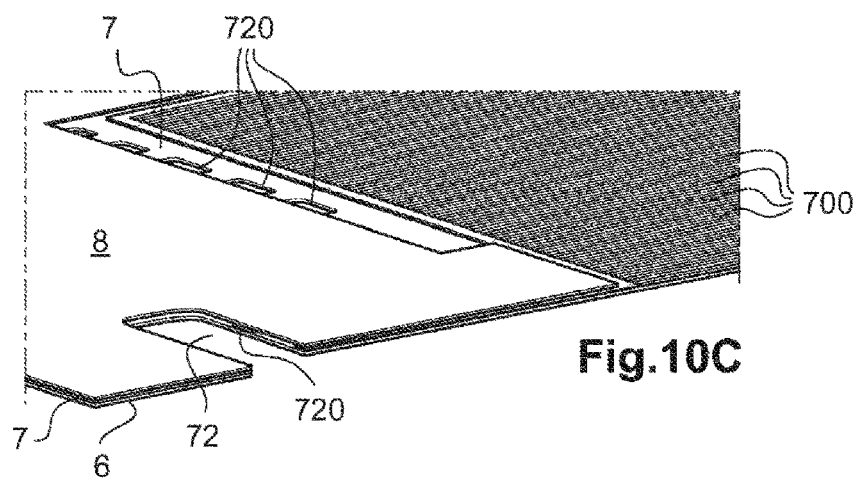
Figure 11:
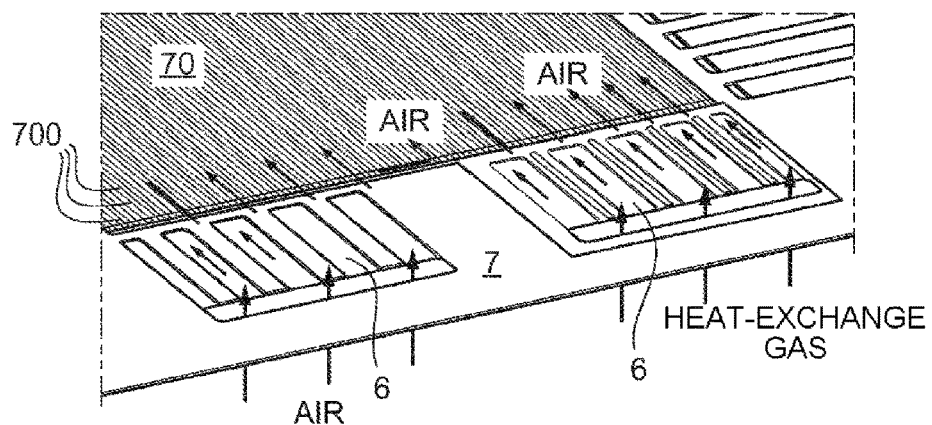
Figure 12:
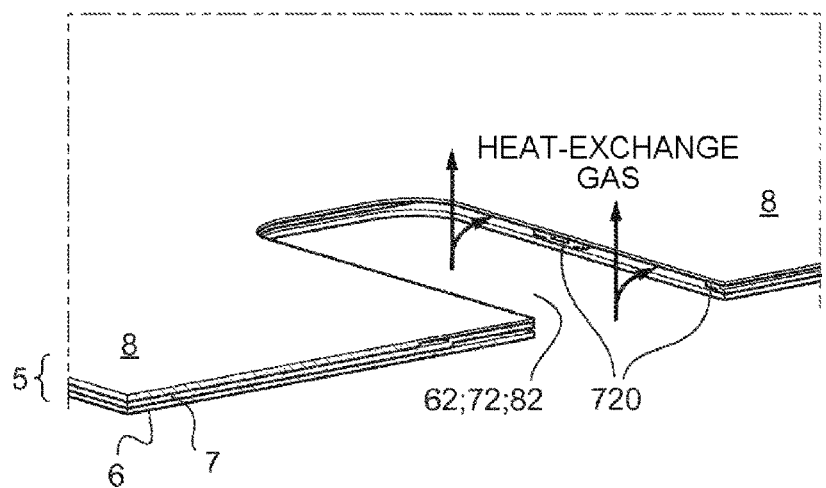
Figure 13:
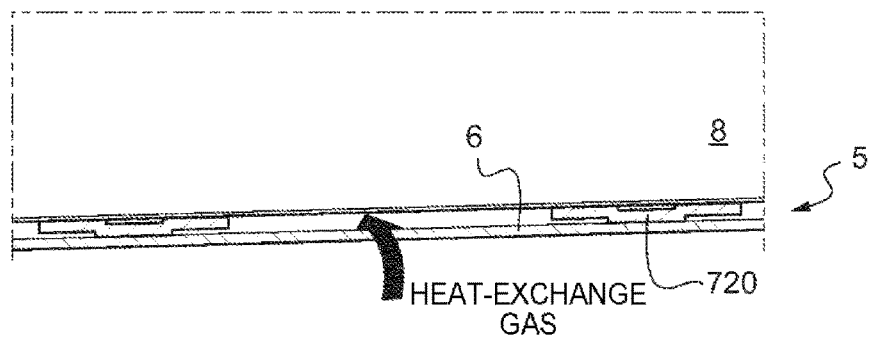
Figure 16:
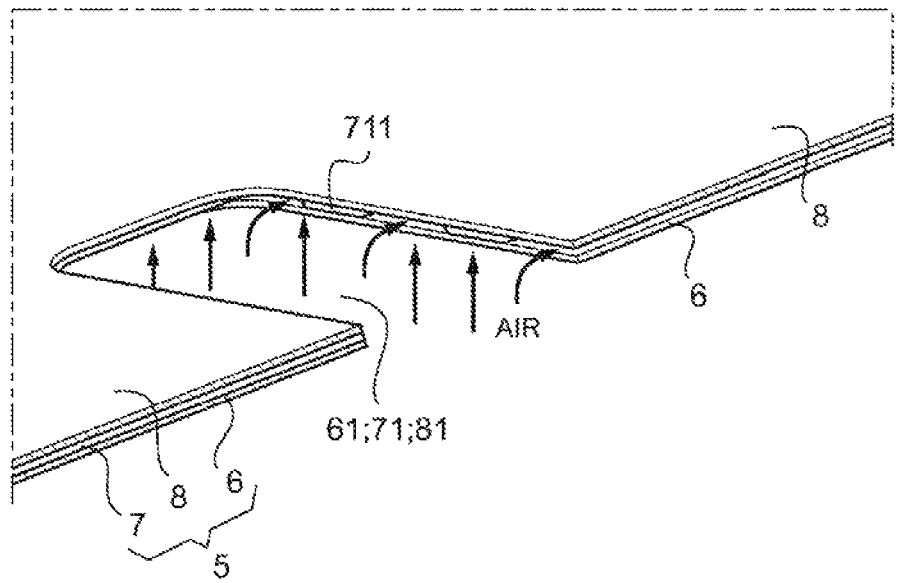
Figure 17:
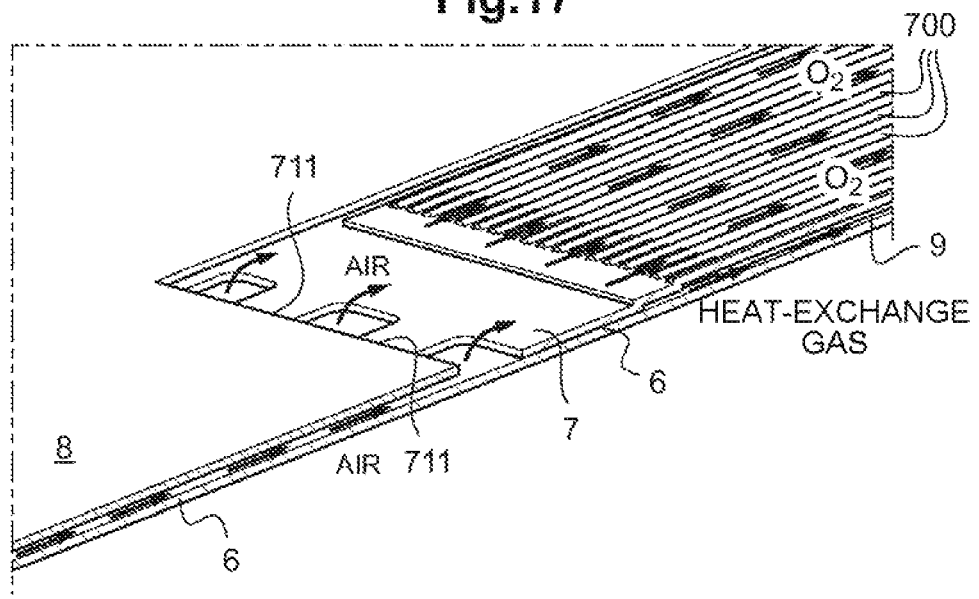
Figure 18:
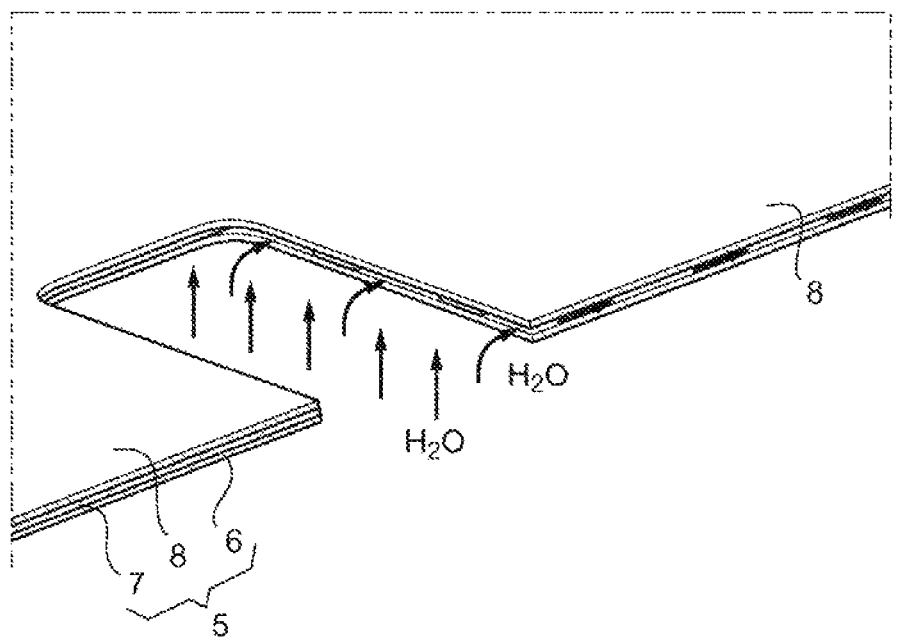
Figure 19:
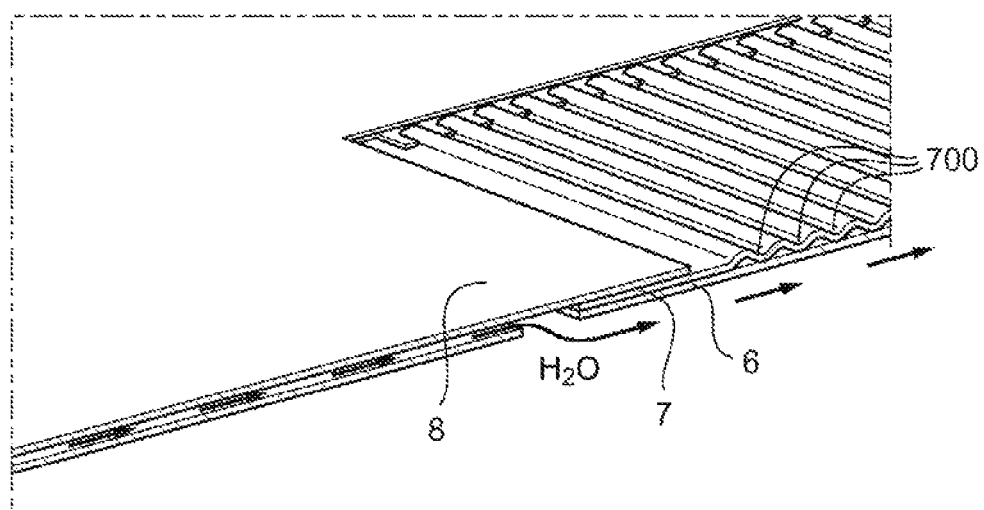
Figure 22:
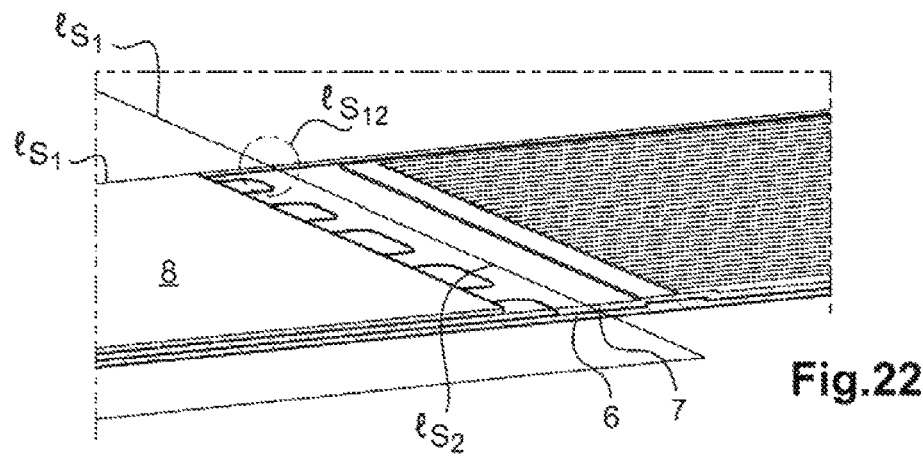
Figure 23:
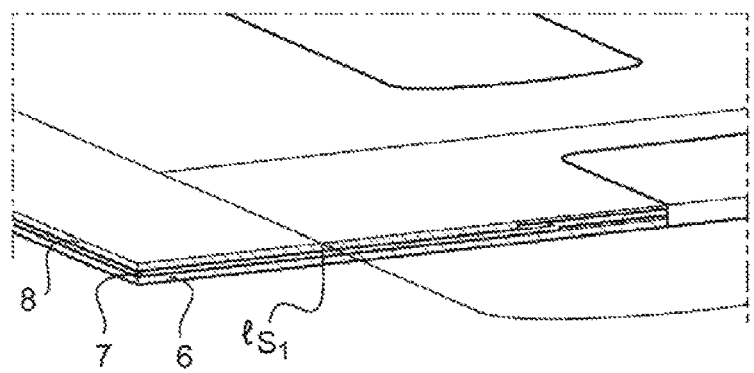
Figure 24:
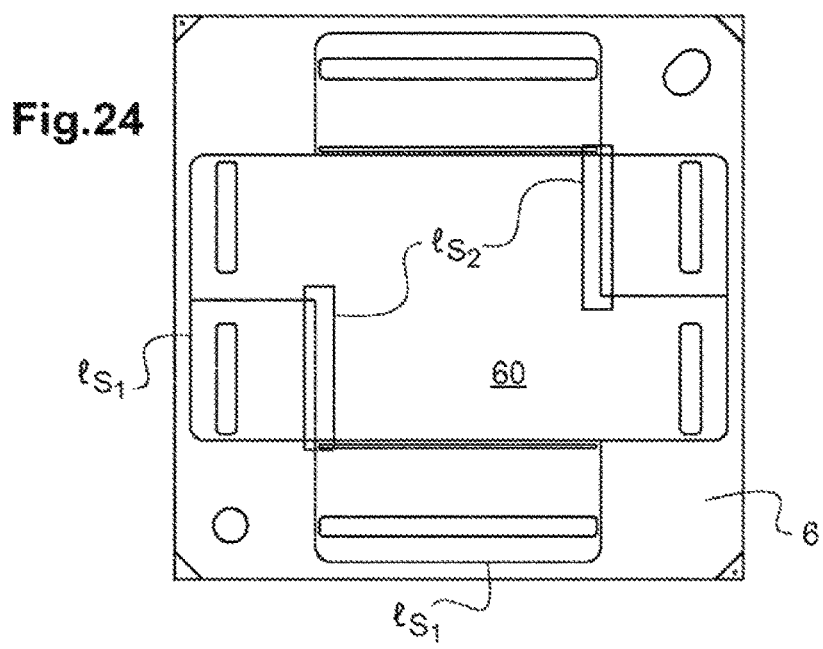

Other advantages and characteristics of the invention will emerge better on reading the detailed description of implementational examples of the invention done by way of illustration and without implied limitation with reference to the following figures, among which:

FIG. 1 is a diagrammatic view showing the operating principle of a high-temperature water electrolyzer;

FIG. 2 is an exploded diagrammatic view of a portion of a high-temperature steam electrolyzer comprising interconnectors according to the state of the art, FIG. 3 is an exploded diagrammatic view of a portion of a fuel cell SOFC comprising interconnectors according to the state of the art, FIG. 4 is a diagrammatic view in partial section of an HTE electrolyzer or of a fuel cell of SOFC type according to the invention with an integrated heat exchanger, within which the heat-exchange fluid circulates, FIG. 5 is a view in perspective of an assembled interconnector of an HTE electrolyzer or of a fuel cell of SOFC type, with an integrated heat exchanger within which a heat-exchange fluid circulates according to an embodiment of the invention, FIG. 6 is an exploded view of the three metal sheets constituting the interconnector according to FIG. 5, FIG. 7 is a view in perspective of a first advantageous embodiment of one of the end metal sheets of the interconnector according to FIGS. 5 and 6, FIG. 8 is a view in perspective of a second advantageous embodiment of one of the end metal sheets of the interconnector according to FIGS. 5 and 6, FIG. 9 is a view in perspective of a third advantageous embodiment of one of the end metal sheets of the interconnector according to FIGS. 5 and 6, FIGS. 10A to 10C are detailed views in perspective and in partial section respectively with the central metal sheet, with one of the end metal sheets laminated with the central metal sheet and finally with the three laminated and assembled metal sheets of an interconnector according to FIGS. 5 to 9, the figures showing the different elements of the supplying and distribution of the heat-exchange gas within the interconnector, FIGS. 11 to 15 are views similar to FIG. 10C, the figures showing the implementation of the supplying and distribution of the heat-exchange gas within the interconnector, FIGS. 16 and 17 are detailed views, in perspective and in section, of the three laminated and assembled metal sheets of an interconnector according to FIGS. 5 to 9, the figures showing the different elements of the feeding and distribution of air as draining gas within the interconnector used in an HTE electrolyzer, FIGS. 18 and 19 are detailed views, in perspective and in section, of the three laminated and assembled metal sheets of an interconnector according to FIGS. 5 to 9, the figures showing the different elements of the feeding and distribution of steam as reactive gas within the interconnector used in an HTE electrolyzer, FIGS. 20 and 21 are front views on the side of one of the end metal sheets of an interconnector according to FIGS. 5 to 9, showing the weld seams producing the assembling of the interconnector, FIGS. 22 and 23 are detailed views, in perspective and in section, of the three laminated and assembled metal sheets of an interconnector according to FIGS. 5 to 9, also showing the weld seams producing the assembling of the interconnector on the side of one of the end metal sheets of the interconnector, FIG. 24 is a front view on the side of the other of the end metal sheets of an interconnector according to FIGS. 5 to 9, showing the weld seams producing the assembling of the interconnector.

It is also specified that, over all of FIGS. 1 to 24, the symbols and the arrows for supplying, on the one hand, steam $H_2O$, for distributing and recovering molecular hydrogen $H_2$ and oxygen $O_2$, and current, and, on the other hand, carbon dioxide $CO_2$, for distributing and recovering carbon monoxide CO and oxygen $O_2$, and current, are shown for the purposes of clarity and accuracy, in order to illustrate the operation of a steam electrolysis reactor according to the state of the art and of a steam electrolysis reactor according to the invention.

It is also specified that the description of FIGS. 4 to 24 of an interconnector with integrated heat exchanger is made for use in a steam electrolysis (HTE) reactor but that it also applies to use for steam co-electrolysis (HTE) or in a fuel cell (SOFC), the reactive or draining gases introduced then being different.

Finally, it is specified that all the electrolyzers or all the fuel cells described are of solid oxide type (SOEC, acronym for "Solid Oxide Electrolyte Cell", or SOFC, "Solid Oxide Fuel Cell") operating at high temperature. Thus, all the constituents (anode/electrolyte/cathode) of an individual electrolysis cell are ceramics. The high operating temperature of an electrolyzer (electrolysis reactor) is typically between 600° C. and 1000° C.

Typically, the characteristics of an individual electrochemical cell SOEC suitable for the invention, of the cathode-supported type (CSC), may be those shown as follows in the table below.

TABLE

| Electrolysis cell | Unit | Value |
|---|---|---|
| Cathode 2 | | |
| Constituent material | | Ni-YSZ |
| Thickness | µm | 315 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Constituent material | | LSM |
| Thickness | µm | 20 |
| Thermal conductivity | W m$^{-1}$ K$^{-1}$ | 9.6 |
| Electrical conductivity | Ω$^{-1}$ m$^{-1}$ | 1 × 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte 3 | | |
| Constituent material | | YSZ |
| Thickness | µm | |
| Resistivity | Ω m | 0.42 |

A water electrolyzer is an electrochemical device for the production of hydrogen (and oxygen) under the effect of an electric current.

In high-temperature electrolyzers HTE, the high-temperature water electrolysis is carried out starting from steam. The function of a high-temperature electrolyzer HTE is to convert steam into hydrogen and oxygen according to the following reaction:

$$2H_2O \rightarrow 2H_2 + O_2.$$

This reaction is carried out electrochemically in the individual cells of the electrolyzer. As represented diagrammatically in FIG. 1, each individual electrolysis cell 1 is formed of a cathode 2 and of an anode 4, placed on either side of a solid electrolyte 3 generally in the membrane form. The two electrodes (cathode and anode) 2, 4 are electron conductors, made of porous material, and the electrolyte 3 is gastight, an electron insulator and an ion conductor. The electrolyte may in particular be an anion conductor, more specifically an anion conductor of $O^{2-}$ ions, and the electrolyzer is then known as anion electrolyzer.

The electrochemical reactions take place at the interface between each of the electron conductors and the ion conductor.

At the cathode 2, the half reaction is as follows:

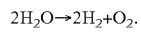

$$2H_2O + 4e^- \rightarrow 2H_2 + 2O^{2-}.$$

At the anode 4, the half reaction is as follows:

$$O_2^- \rightarrow O_2 + 4e^-.$$

The electrolyte 3 inserted between the two electrodes 2, 4 is the site of migration of the $O^{2-}$ ions under the effect of the electric field created by the difference in potential imposed between the anode 4 and the cathode 2.

As illustrated in brackets in FIG. 1, the steam at the cathode inlet may be accompanied by hydrogen $H_2$ and the hydrogen produced and recovered at the outlet may be accompanied by steam. Likewise, as illustrated in dotted lines, a draining gas, such as air, may additionally be injected at the inlet in order to remove the oxygen produced. The injection of a draining gas has the additional role of acting as thermal regulator.

An individual electrolysis reactor consists of an individual cell as described above, with a cathode 2, an electrolyte 3 and an anode 4, and of two monopolar connectors which provide the electrical, hydraulic and thermal distribution functions.

In order to increase the flow rates of hydrogen and oxygen produced, it is known to stack several individual electrolysis cells on top of one another, separating them with interconnection devices, usually known as bipolar interconnection plates or interconnectors. The assembly is positioned between two end interconnection plates which bear the electrical supplies and gas supplies of the electrolyzer (electrolysis reactor).

A high-temperature water electrolyzer (HTE) thus comprises at least one, generally a plurality of individual electrolysis cells stacked on top of one another, each individual cell being formed of an electrolyte, of a cathode and of an anode, the electrolyte being inserted between the anode and the cathode.

The fluidic and electrical interconnection devices which are in electrical contact with one or more electrodes generally provide the functions of introducing and for collecting electrical current and deliver one or more compartments for the circulation of the gases.

Thus, a "cathode" compartment has the role of distributing the electrical current and steam and also of recovering the hydrogen at the cathode in contact.

An "anode" compartment has the role of distributing the electrical current and also of recovering the oxygen produced at the anode in contact, optionally with the help of a draining gas.

Satisfactory operation of an HTE electrolyzer requires:

good electrical insulation between two adjacent interconnectors in the stack, otherwise the individual electrolysis cell inserted between the two interconnectors will be short-circuited, good electrical contact and a sufficient contact surface area between each individual cell and interconnector, in order to obtain the smallest possible ohmic resistance between individual cell and interconnectors, good leaktightness between the two separate compartments, i.e. and cathode compartment, otherwise the gases produced will recombine, resulting in a falling yield and in particular in the appearance of hot spots which damage the electrolyzer, good distribution of the gases both at the inlets and on recovery of the gases produced, otherwise there will be a loss of yield, nonuniformity of pressure and nonuniformity of temperature within the different individual cells, indeed even totally unacceptable deterioration of the cells.

FIG. 2 represents an exploded view of individual units of a high-temperature steam electrolyzer according to the state of the art. This HTE electrolyzer comprises a plurality of individual electrolysis cells C1, C2 of solid oxide (SOEC) type stacked alternately with interconnectors 5. Each individual cell C1, C2, and the like consists of a cathode 2.1, 2.2, and the like and of an anode 4.1, 4.2, between which an electrolyte 3.1, 3.2, and the like is positioned.

The interconnector 5 is a component made of metal alloy which provides the separation between the cathode compartment 50 and the anode compartment 51, defined by the volumes between the interconnector 5 and the adjacent anode 4.2 and between the interconnector 5 and the adjacent cathode 2.1 respectively. It also provides the distribution of the gases to the individual cells. The injection of steam into each individual unit takes place in the cathode compartment 50. The collecting of the hydrogen produced and of the residual steam at the cathode 2.1, 2.2, and the like is carried out in the cathode compartment 51 downstream of the individual cell C1, C2, and the like after disassociation of the steam by the latter. The collecting of the oxygen produced at the anode 4.2 is carried out in the anode compartment 51 downstream of the cell C1, C2, and the like after dissociation of the steam by the latter.

The interconnector 5 provides the passage of the current between the individual cells C1 and C2 by direct contract with the adjacent electrodes, that is to say between the anode 4.2 and the cathode 2.1.

One and the same interconnector 5 may be used in an HTE co-electrolysis reactor in which, in place of steam, a mixture of steam and carbon dioxide ($CO_2$) is supplied and distributed to the cathodes.

The overall electrolysis or co-electrolysis reaction within an HTE reactor may either be exothermic or endothermic.

FIG. 3 represents an exploded view of individual units of an SOFC fuel cell according to the state of the art: the same individual units as those of FIG. 2 are employed for an SOFC fuel cell with individual cells of individual fuel cells C1, C2 and the interconnectors 5. The cathodes 2.1, 2.2, and the like of the HTE electrolyzer are then used as anodes in the SOFC cell and the anodes 4.1, 4.2, and the like of the HTE electrolyzer are for their part used as cathodes in SOFC cells. Thus, in operation as an SOFC cell, the injection of the air containing the oxygen into each individual unit takes place in the cathode compartment 51. The collecting of the water produced at the anode is carried out in the anode compartment downstream of the individual cell C1, C2, after recombination of water by the latter with the hydrogen $H_2$ injected in the anode 2.2 into each anode compartment upstream of the cell C1, C2. The current produced during the recombination of the water is collected by the interconnectors 5.

The overall reaction within an SOFC cell is exothermic.

In order to manage as best as possible the thermal operating conditions both for an application in HTE electrolysis or co-electrolysis and in an SOFC fuel cell, the inventors have thought of incorporating a heat exchanger within the interconnector with a circuit of the heat-exchange fluid, separate from the inlet of the reactor, circuits of the reactive gases and of the draining gas up to either the outlet of the reactor or a region in which the heat-exchange fluid may be mixed with one of the reactive gases or the draining gas, in order to manage the mixing fluidics of the gases.

FIG. 4 diagrammatically shows the incorporation of a heat-exchange gas circuit within the embossed feature 700 of a central metal sheet of an interconnector 5 according to the invention, produced from three metal sheets 6, 7 and 8 as described below. This FIG. 3 furthermore shows the leaktightness seals 20, 40 respectively dedicated to the compartments for circulation of the steam and hydrogen and to the compartments of circulation of the air and oxygen produced. As described in detail below, the end steel sheets 6 and 8 of the interconnector 5 on which the seals 20 and 40 are carried are flat metal sheets, which makes it possible to have good resistance of these seals to high temperatures, typically at 800° C.

For an application in HTE, when it is desired to mix the heat-exchange gas with the hydrogen produced upstream or respectively with hydrogen and carbon monoxide produced upstream, the heat-exchange gas is preferably chosen from carbon dioxide ($CO_2$), hydrogen ($H_2$), carbon monoxide (CO), steam ($H_2O$) and mixtures of these. It is thus possible to optimize the flow rates and the steam electrolysis and co-electrolysis reaction with a dedicated mixture.

Also for an application in HTE, when it is desired to mix the heat-exchange gas with the oxygen produced upstream and the draining gas, the heat-exchange gas is preferably chosen from air, oxygen ($O_2$) or a mixture of these. It is thus possible to increase the flow rate of draining gas and more generally to improve the removal of the oxygen produced or to limit the oxygen content of the outlet gas for safety reasons, for example.

For an application in an SOFC cell, when it is desired to mix the heat-exchange gas with air and/or oxygen ($O_2$) originating from the upstream side, the heat-exchange gas is preferably chosen from air, air not depleted in oxygen, oxygen or mixtures of these.

Also for application in an SOFC cell, when it is desired to mix the heat-exchange gas with the water produced upstream and, if appropriate, the fuel, being chosen from hydrogen, steam ($H_2O$), carbon dioxide ($CO_2$), methane ($CH_4$), carbon monoxide (CO) or mixtures of these. It is thus possible to optimize the flow rates and the consumption of the fuel.

FIGS. 5 and 6 show an interconnector 5 according to the invention with these three metal sheets 6 to 8 constituting it assembled and laminated. This interconnector 5 makes it possible to ensure, by separate circuits, the simultaneous distribution and simultaneous supplying of steam $H_2O$, of the draining gas and of the heat-exchange gas from the inlet of the reactor as well as the recovery respectively of the hydrogen and the oxygen $O_2$ produced within the stack of an electrolysis reactor and the heat-exchange gas which has been used to manage the thermal conditions. As described in detail subsequently, the interconnector 5 makes it possible to ensure a circulation of the gas ($H_2O/H_2$) at the cathodes of the individual cells crosscurrentwise at 90° with the circulation of the recovered gas ($O_2$, if appropriate with draining gas) at the anodes of the individual cells and with the circulation of the heat-exchange gas within the interconnector.

The interconnector 5 consists of three metal sheets 6, 7, 8 extended along two axes of symmetry (X, Y) orthogonal to one another, the metal sheets being laminated and assembled together by welding. A central metal sheet 7 is inserted between a first end metal sheet 6 and a second end metal sheet 8.

The two end metal sheets 6 and 8 are flat, all the reliefs of embossed features making possible the circulation of the fluids at the anodes of the cells and all the reliefs of embossed features making possible the circulation of the heat-exchange gas being produced only on the central metal sheet 7.

The first flat end metal sheet 6 is intended to come into mechanical contact with the plane of a cathode 2.2 of an individual electrolysis cell (C2) and the embossed central metal sheet 7, exceeding in height the flat end metal sheet 8, is intended to come into mechanical contact with the plane of an anode 4.1 of an adjacent individual electrolysis cell (C1), each of the two adjacent individual electrolysis cells (C1, C2) of SOEC type being formed of a cathode 2.1, 2.2, of an anode 4.1, 4.2 and of an electrolyte 3.1, 3.2 inserted between the cathode and the anode.

A description is now given, with reference to FIGS. 5 to 9, of the embodiment of the metal sheets 6, 7, 8 of the interconnector 5 dedicated to the steam electrolysis and of their assembling in order to carry out the electrolysis process with exchange of heat by the heat-exchange gas according to the invention.

The central metal sheet 7 comprises an embossed central part 70 defining embossed features 700 and is pierced at the periphery of its central part with at least six ports 71, 72, 73, 74, 75 and 76.

One of the flat end metal sheets 6 comprises a flat central part 60 and is pierced, at the periphery of its central part, with at least six ports 61, 62, 63, 64, 65, 66. The first end metal sheet 6 additionally comprises two slits 67, 68 ports arranged symmetrically on either side of the axis Y, inside its first to fourth ports 61 to 64, and are extended over a length corresponding substantially to the length of the central part along the axis Y.

The other of the flat end metal sheets 8 comprises a hollowed-out central part 80 and is pierced, at the periphery of its central part, with at least six ports 81, 82, 83, 84, 85, 86.

The first 61, 71, 81 to fourth 64, 74, 84 ports of each metal sheet are extended over a length corresponding to a portion of the length of the central part 60, 70, 80 along one of the axes X of the metal sheets and are divided in pairs on either side of said axis X.

The fifth 65, 75, 85 and sixth 66, 76, 86 ports are extended over a length corresponding substantially to the length of the central part 60, 70, 80 along the other of the axes Y.

As seen in FIGS. 5 to 9, the first 71, second 72, third 73 and fourth 74 ports of the central metal sheet 7 are widened with respect respectively to the first 61, 81, second 62, 82, third 63, 83 and fourth 64, 84 ports of each flat end metal sheet 6, 8.

Likewise, the fifth 75, and sixth 76 ports of the central metal sheet 7 are widened respectively to the fifth 65, 85, and sixth 66, 86 ports of each flat end metal sheet 6, 8.

All the widened ports 71, 72, 73, 74, 75, 76 of the central metal sheet 7 comprise, in their widened part, tongues of metal sheets 710, 720, 730, 740 spaced out from one another with the formation of a comb.

As illustrated in FIGS. 10C and 17, each of the slits 711 defined between the edge of a widened port 71 and a tongue 710 or between two consecutive tongues emerges on the channels defined by the embossed features 700. It is the same for the slits produced on the side of the widened port 73.

As shown in detail in FIGS. 10A, 10B, 11, 12 and 13, the tongues 720 produced in the widened port 72 are embossed, defining both a supporting surface and a spacing between the end metal sheets 6 and 8 once the lamination and the assembling of the three metal sheets 6, 7 and 8 has been carried out. It is the same with the tongues produced in the widened port 74.

For each of the widened slits 75, 76, the slits between tongues of sheet metal thus defined are provided in order to emerge on one of the ports 65, 66 of the end flat metal sheet 6 once the lamination and the assembling of the three metal sheets 6, 7 and 8 has been carried out.

The lamination and the assembling of the three metal sheets 6, 7, 8 together are carried out such that:

each of the first to sixth ports 61 to 66 of the flat end metal sheet 6 is in fluidic communication individually respectively with one of the corresponding first to sixth ports 71 to 76; 81 to 86 of the other two metal sheets 7 and 8, the first port 71 of the central metal sheet 7 is in fluidic communication with the third port 73 of the central metal sheet 7 via the spaces 711 between tongues 710 of the first port 71, the channels defined by the embossed features 700 and the spaces between tongues 730 of the third port 73 of the central metal sheet 7, the second port 72 of the central metal sheet 7 is in fluidic communication with the fourth port 74 of the central metal sheet 7 via the spaces between tongues 720 of the second port 72 of the central metal sheet 7, the interior chamber 9 delimited between the embossed features 700 and the flat central part 60 of the end metal sheet 6 and the spaces between tongues 740 of the fourth port 74 of the central metal sheet 7, the fifth 65 and the sixth 66 port of the end metal sheet 6 are in fluidic communication with one of the slits 67 and respectively the other of the slits 68 of the first end metal sheet 6 via the spaces between tongues of the fifth 75 and respectively the sixth 76 port of the central metal sheet 7.

As shown in FIGS. 10A to 13, the comb formed 720, 721 allows the heat-exchange gas to pass from the supply manifold 62, 72, 82 to the heat exchange chamber 9 by passing into the space between the central metal sheet 7 and the end metal sheet 6. The embossed features 720 of the tongues confer on them a function of cross struts and thus guarantee the height of the passage of the heat-exchange gas in the chamber 9 defined between the metal sheets 6, 7. Such a passage of the gases according to the invention via the interior of the interconnector 5 thus makes it possible to ensure the circulation of heat-exchange gas in a circuit separate from the circuits of circulation of the steam/hydrogen produced and of the draining gas/oxygen recovered.

Generally, all the comb shapes for the widened slits make possible a homogenous distribution of each gas ($H_2O$, air, heat-exchange gas) over the individual electrolysis cell or in the heat-exchange chamber 9 and, by virtue of these comb shapes for the widened slits, a recovery of the gas produced ($H_2$, $O_2$) or of the heat-exchange gas at the outlet.

The two flat metal sheets 6 and 8 and the embossed central metal sheet 7 constituting an interconnector 5 according to the invention are thin metal sheets which are pierced and assembled together by welds. Preferably, the thin metal sheets are metal sheets with a thickness of less than 3 mm, typically of the order of 0.2 mm. All the welds between metal sheets produced in the manufacture, apart from any operation of the electrolyzer, may be advantageously produced according to a laser transparency technique, which is possible as a result of the low thickness of the thin metal sheets, typically of the order of 0.2 mm.

All the metal sheets are advantageously made of ferritic steel with the order of 20% of chromium, preferably made of Crofer® 22APU, or FT18TNb based on nickel of Inconel® 600 or Haynes® type in thicknesses typically of between 0.1 and 1 mm.

The assembling by weld seams around the ports between metal sheets 6, 7, 8 guarantees good leaktightness between the steam introduced $H_2O$/air (draining gas)/heat-exchange gas and the hydrogen $H_2$/oxygen produced and recovered/heat-exchange gas recovered during the operation of the electrolyzer.

The weld seams which were produced for the definitive assembling of the three metal sheets 6, 7, 8, typically with a thickness each of 0.2 mm, in order to constitute an interconnector 5 according to the invention, have been represented in detail in FIGS. 20 to 24.

The following weld seams have been distinguished in these figures:

$ls_1$, which are the main weld seams in the regions where the three metal sheets 6, 7, 8 are present, $ls_2$, which are the main weld seams in the regions where only the end metal sheet 6 and the central metal sheet 7 are present, $ls_{12}$, which are the regions of junction of the weld seams $ls_1$ and $ls_2$, $ls_3$, which are the secondary weld seams in the regions where the three metal sheets 6, 7, 8 are present.

As illustrated over the whole of FIGS. 5 to 9, the three metal sheets 6, 7, 8 are pierced at their periphery with additional ports 69, 79, 89 appropriate for housing fixing rods. These fixing rods make it possible to apply a force for holding, in the stack, the different components of the electrolysis reactor.

Also as illustrated over the whole of FIGS. 5 to 9, the two flat end metal sheets 6 and 8, angles 6c and 8c which are cut out in order to be able to put in measurement instrumentation, such as potential connections or thermocouples.

Different advantageous embodiments which make possible the injection of heat-exchange gas into the hydrogen or the oxygen produced upstream may be employed with an interconnector according to the invention.

These advantageous modes make it possible to manage the mixing of the heat-exchange gas along the route of the gases on an individual electrochemical cell, it being possible for this heat-exchange gas to advantageously be one of the reactive gases. Thus, a mixture of the reactive gas with the gas already produced is obtained not at the individual cell inlet but in a predetermined region within the individual cell, making it possible to thus optimize as best as possible the electrolysis reaction or the fuel cell reaction.

A first form is illustrated in FIG. 7: the flat end metal sheet 6 additionally comprises at least one third slit 67' extended over a length corresponding substantially to the length of the central part 60 along the axis Y. This (these) slit(s) 67' is (are) arranged between the two other slits 67, 68 of the first end metal sheet 6. The assembling of the metal sheets is carried out so that this third extended slit 67' is in fluidic communication with the interior chamber 9. This slit 67', which is central in the example illustrated, thus makes possible the injection of the heat-exchange gas and thus its mixing with the hydrogen produced upstream. It is possible to provide a plurality of slits 67' parallel to one another between the two slits 67 and 68 in order to distribute the mixing regions and the related flow rate. The injection of the heat-exchange gas may, according to this alternative form, consist of an enriching in steam $H_2O$, in carbon monoxide CO or in carbon dioxide $CO_2$ in co-electrolysis, for example.

A second form is illustrated in FIG. 8: the central metal sheet 7 additionally comprises a slit 701 produced along an embossed channel 700, extended over a length corresponding substantially to the length of the central part 70 along the axis Y. The assembling of the metal sheets is carried out so that this extended slit 701 is in fluidic communication with the interior chamber 9. This slit 701, which is central in the example illustrated, thus makes possible the injection of the heat-exchange gas and thus its mixing with oxygen produced upstream. It is possible to provide a plurality of slits 701 parallel to one another, each produced at the bottom of an embossed channel 700, in order to distribute the mixing regions and the related flow rate. The injection of the heat-exchange gas may, according to this alternative form, consist of an enriching in $O_2$, for example in an SOFC fuel cell.

A third form is illustrated in FIG. 9: the central metal sheet 7 additionally comprises a slit 702, produced transversely to all of the embossed channels 700, which is extended over a length corresponding substantially to the length of the central part 70 along the axis X. The assembling of the metal sheets is carried out so that this extended slit 702 is in fluidic communication with the internal chamber 9. This slit 702, which is central in the example illustrated, thus makes possible the injection of the heat-exchange gas and thus its mixing with oxygen produced upstream. It is possible to provide a plurality of slits 702 parallel to one another, each produced transversely to the embossed channels 700, in order to distribute the mixing regions and the related flow rate. The injection of the heat-exchange gas may, according to this alternative form, consist of an enriching in $O_2$, for example in an SOFC fuel cell.

Thus, the slit or slits 67' are intended to bring the heat-exchange fluid into communication with the cathode, while the slits 701 and 702 are intended to bring the heat-exchange fluid into communication with the anode.

A description is now given, with reference to FIGS. 4 to 19, of the process of operation of an electrolysis reactor according to the invention as just described:

the first ports 61, 71, 81 are supplied with draining gas, such as air, and simultaneously the second ports 62, 72, 82 are supplied with a heat-exchange gas capable of removing or introducing heat, the firth ports 65, 75, 85 are supplied with steam, the hydrogen produced by steam electrolysis is recovered in the sixth ports 66, 76, 86 and simultaneously the heat-exchange gas is recovered in the fourth ports 64, 74, 84 and simultaneously the oxygen produced by steam electrolysis and if appropriate by co-electrolysis is recovered in the third ports 63, 73, 83.

According to a first alternative form, when the heat-exchange gas is injected via the third slit 67' of the end metal sheet 6, the gas produced by co-electrolysis of the steam and the reactive heat-exchange gas is recovered in the port 66.

According to a second or a third alternative form, when the heat-exchange gas is injected via the slit 701 or the slit 702 of the central metal sheet 7, the oxygen $O_2$, optionally enriched by the heat-exchange gas, is recovered in the port 63.

The course of the heat-exchange gas injected in supplying within an interconnector 5 is represented diagrammatically more precisely in FIGS. 11 to 15.

The course of the air as draining gas injected within an interconnector 5 is represented diagrammatically more precisely in FIGS. 16 and 17.

The course of the steam injected within an interconnector 5 is represented diagrammatically more precisely in FIGS. 18 and 19.

Although not illustrated, when the heat-exchange gas capable of removing the heat is in addition a fuel, a process of operation of a fuel cell incorporating interconnectors 5 according to the invention described above for its part comprises the following stages:

the first ports 61, 71, 81 are supplied with air and/or with oxygen and simultaneously the second ports 62, 72, 82 are supplied with the heat-exchange gas, the fifth ports 65, 75, 85 are supplied with fuel, the water produced and, if appropriate the surplus fuel and, if appropriate, the heat-exchange gas introduced via the third slit 67' of the end metal sheet 6 are recovered in the sixth ports 66, 76, 86 and simultaneously the heat-exchange gas is recovered in the fourth ports 64, 74, 84 and simultaneously the air and/or the oxygen is/are recovered in the third ports 63, 73, 83.

When the heat-exchange gas capable of removing heat is in addition an oxidant, then the stages are as follows:

the first ports 61, 71, 81 are supplied with air and/or with oxygen and simultaneously the second ports 62, 72, 82 are supplied with the heat-exchange gas, the fifth ports 65, 75, 85 are supplied with fuel, the water produced and, if appropriate, the surplus fuel and, if appropriate, the heat-exchange gas introduced via the slit(s) 701, 702 of the central metal sheet 7 are recovered in the sixth ports 66, 76, 86 and simultaneously the heat-exchange gas is recovered in the fourth ports 64, 74, 84 and simultaneously the air and/or the oxygen is/are recovered in the third ports 63, 73, 83.

The invention is not limited to the examples which have just been described; it is possible in particular to combine together characteristics of the examples illustrated within non-illustrated variants.

Thus, the high-temperature electrolysis process with integrated exchanger according to the invention may also be employed to carry out the high-temperature electrolysis of nitrogen dioxide ($NO_2$).

The invention claimed is:

1. A device forming an electrical and fluidic interconnector for a high-temperature electrolysis of steam or for a high-temperature co-electrolysis with carbon dioxide CO2, or an SOFC fuel cell, the device consisting of three metal sheets, extended along two axes of symmetry orthogonal to one another, one of the end metal sheets being intended to come into mechanical contact with the plane of a cathode of an individual electrochemical cell and another of the metal sheets being intended to come into mechanical contact with the plane of an anode of an adjacent individual electrochemical cell, each of the two adjacent individual electrochemical cells of SOEC type being formed of a cathode, of an anode and of an electrolyte inserted between the cathode and the anode, in which device:

one of the three metal sheets, referred to as central metal sheet, comprises an embossed central part comprising embossed features defining channels and is pierced, at the periphery of its central part, with at least six ports, the first to fourth ports being extended each over a length corresponding to a portion of the length of the central part along one of the axes X and being distributed in pairs on either side of said axis X, whereas the fifth and sixth ports are extended each over a length corresponding substantially to the length of the central part along the other of the axes Y, one of the end metal sheets, referred to as first end metal sheet, being a flat metal sheet comprising a central part and the first end metal sheet being pierced, at the periphery of its central part, with at least six ports, the first to fourth ports being extended each over a length corresponding to a portion of the length of the central part of the first end metal sheet along one of the axes X and being distributed in pairs on either side of said axis X, whereas the fifth and sixth ports are extended each over a length corresponding substantially to the length of the central part of the first end metal sheet along the other of the axes Y, the central part being pierced with at least two slits extended each over a length corresponding substantially to the length of the central part of the first end metal sheet along the other of the axes Y, the other of the end metal sheets, referred to as second end metal sheet, being a flat metal sheet comprising a hollowed-out central part and is pierced, at the periphery of its central part, with at least six ports, the first to fourth ports being extended each over a length corresponding to a portion of the length of the central part of the second end metal sheet along one of the axes X and being distributed in pairs on either side of said axis X, whereas the fifth and sixth ports are extended each over a length corresponding substantially to the length of the central part of the second end metal sheet along the other of the axes Y, the six ports of the central metal sheet each comprise tongues of steel sheets spaced out from one another, forming a comb, and each comprise slits defined between the edge of one of the ports and a or between two consecutive tongues, the three metal sheets are laminated and assembled together such that:

each of the first to sixth ports of one of the three metal sheets is in fluidic communication individually respectively with one of the corresponding first to sixth ports of the other two metal sheets, the first port of the central metal sheet is in fluidic communication with the third port of the central metal sheet via the spaces between tongues of the first port, the channels defined by the embossed features and the spaces between tongues of the third port of the central metal sheet, the second port of the central metal sheet is in fluidic communication with the fourth port of the central metal sheet via the spaces between tongues of the second port of the central metal sheet, the interior chamber delimited between the embossed features and the flat central part of the first end metal sheet and the spaces between tongues of the fourth port of the central metal sheet, the fifth and the sixth port of the first end metal sheet are in fluidic communication with one of the slits and respectively the other of the slits of the first end metal sheet via the spaces between tongues of the fifth port and respectively the sixth of the central metal sheet.

2. The device forming the electrical and fluidic interconnector as claimed in claim 1, wherein:

the first end metal sheet additionally comprises one or more extended third slits over a length corresponding substantially to the length of the central part along the other of the axes Y, the or each third slit being arranged between the other two slits of the first end metal sheet, the three metal sheets are assembled together such that the extended the or each third slit of the first end metal sheet is in fluidic communication with the interior chamber.

3. The device forming the electrical and fluidic interconnector as claimed in claim 1, wherein:

the central metal sheet additionally comprises one or more extended slits over a length corresponding substantially to the length of the central part along the other Y of the axes, the or each slit being arranged along an embossed channel, the three metal sheets are assembled together such that the or each extended slit of the central metal sheet is in fluidic communication with the interior chamber.

4. The device forming the electrical and fluidic interconnector as claimed in claim 1, wherein:
the central metal sheet additionally comprises one or more extended slits over a length corresponding substantially to the length of the central part along the other Y of the axes, the or each slit being arranged transversely to the embossed channels,
the three metal sheets are assembled together such that the or each extended slit of the central metal sheet is in fluidic communication with the interior chamber.

5. The device forming the electrical and fluidic interconnector as claimed in claim 1, wherein the three metal sheets are assembled together by welding or by brazing.

6. The device forming the electrical and fluidic interconnector as claimed in claim 5, wherein the three metal sheets are assembled together by weld seams close individually around each fluidic communication.

7. The device forming the electrical and fluidic interconnector as claimed in claim 1, wherein the three metal sheets are made of ferritic steel comprising approximately 20% of chromium, preferably made of Crofer® 22APU, or FT18TNb, based on nickel of Inconel® 600 or Haynes® type.

8. The device forming the electrical and fluidic interconnector as claimed in in claim 1, wherein the tongues of the second port of the central metal sheet and the tongues of the fourth port of the central metal sheet comprise embossed features over at least a portion of their length, the embossed features being supported against the peripheral part of the first end metal sheet.

9. The device forming the electrical and fluidic interconnector as claimed in claim 1, wherein the three metal sheets are pierced at their periphery with additional ports configured for housing fixing rods.

10. An electrolysis or co-electrolysis reactor comprising a stack of individual solid oxide electrochemical cells each formed of a cathode (the like), of an anode and of an electrolyte inserted between the cathode and the anode, and a plurality of electrical and fluidic interconnectors as claimed in claim 1, each arranged between two adjacent individual cells with the first end metal sheet in electrical contact with the cathode of one of the two individual cells and the embossed features of the central metal sheet with the anode of the other of the two individual cells.

11. A process for the operation of an electrolysis reactor as claimed in claim 10, according to which:
the first ports are supplied with draining gas, such as air and/or oxygen (O2), and simultaneously the second ports are supplied with a heat-exchange gas capable of removing or introducing heat, the heat-exchange gas being chemically neutral with regard to hydrogen,
the fifth ports are supplied with steam and/or with hydrogen,
the hydrogen produced by the electrolysis of the steam and, if appropriate, the gas produced by the co-electrolysis of the steam and of the heat-exchange gas introduced by the one or more third slits of the first end metal sheet are recovered in the sixth ports and simultaneously the heat-exchange gas is recovered in the fourth ports and simultaneously the oxygen produced by the electrolysis of the steam and if appropriate by the co-electrolysis is recovered in the third ports.

12. The process for the operation of an electrolysis reactor as claimed in claim 10,:
the first ports are supplied with draining gas, such as air and/or oxygen (O2), and simultaneously the second ports are supplied with a heat-exchange gas capable of removing or introducing heat, the heat-exchange gas being chemically neutral with regard to oxygen,
the fifth ports are supplied with steam and/or with hydrogen,
the hydrogen produced by the electrolysis of the steam and, if appropriate, the gas produced by the co-electrolysis of the steam and the heat-exchange gas introduced by the one or more extended slits of the central metal sheet are recovered in the sixth ports and simultaneously the heat-exchange gas is recovered in the fourth ports and simultaneously the oxygen produced by the electrolysis of the steam and if appropriate by the co-electrolysis is recovered in the third ports.

13. The process for the operation of an electrolysis reactor as claimed in claim 11, the heat-exchange gas introduced by the one or more third slits, mixed with the hydrogen produced upstream or respectively with hydrogen and carbon monoxide which are produced upstream, being chosen from carbon dioxide (CO2), hydrogen (H2), carbon monoxide (CO), methane (CH4), steam (H2O) or mixtures of these.

14. The process for the operation of an electrolysis reactor as claimed in claim 13, the carbon dioxide as heat-exchange gas being mixed with the steam and the hydrogen produced from the first upstream region.

15. The process for the operation of an electrolysis reactor as claimed in claim 11, the heat-exchange gas introduced by the one or more third slits, mixed with the oxygen produced upstream of the second region and the draining gas, being chosen from air, oxygen (O2) or a mixture of these.

16. The process for the operation of an electrolysis reactor as claimed in claim 11, according to which operating conditions in exothermic mode are defined for the electrolysis or respectively the co-electrolysis of the steam at the cathodes of the individual cells, the heat given off by the electrolysis or respectively the co-electrolysis being removed by the heat-exchange gas.

17. The process for the operation of an electrolysis reactor as claimed in claim 1, according to which operating conditions in endothermic mode are defined for the electrolysis or respectively the co-electrolysis of the steam at the cathodes of the individual cells, the heat absorbed by the electrolysis or respectively the co-electrolysis being contributed by the heat-exchange gas.

18. A fuel cell comprising a stack of individual solid oxide electrochemical cells each formed of an anode, of a cathode and of an electrolyte inserted between the cathode and the anode, and a plurality of electrical and fluidic interconnectors as claimed in claim 1, each arranged between two adjacent individual cells with the first end metal sheet in electrical contact with the anode of one of the two individual cells and the embossed features of the central metal sheet with the cathode of the two individual cells.

19. A process for the operation of a fuel cell (SOFC) as claimed in claim 18, according to which:
the first ports are supplied with air and/or with oxygen and, simultaneously, the second ports are supplied with a heat-exchange gas capable of removing heat, the heat-exchange gas additionally being a fuel,
the fifth ports are supplied with fuel,
the water produced and, if appropriate, the surplus fuel and, if appropriate, the heat-exchange gas introduced by the one or more third slits of the end metal sheet are recovered in the sixth ports and simultaneously the heat-exchange gas is recovered in the fourth ports and simultaneously the air and/or the oxygen is recovered in the third ports.

20. The process for the operation of a fuel cell (SOFC) as claimed in claim 18, according to which:
the first ports are supplied with air and/or with oxygen and simultaneously the second ports are supplied with a heat-exchange gas capable of removing heat, the heat-exchange gas additionally being an oxidant,
the fifth ports are supplied with fuel,
the water produced and, if appropriate, the surplus fuel and, if appropriate, the heat-exchange gas introduced by the one or more slit(s) of the central metal sheet are recovered in the sixth ports and simultaneously the heat-exchange gas is recovered in the fourth ports and simultaneously the air and/or the oxygen is/are recovered in the third ports.

21. The process for the operation of a fuel cell (SOFC) as claimed in claim 19, the heat-exchange gas introduced by the one or more third slits, mixed with the water and/or the carbon dioxide ($CO_2$) produced upstream and, if appropriate, the surplus fuel, being chosen from hydrogen ($H_2$), steam ($H_2O$), carbon dioxide ($CO_2$), methane ($CH_4$), carbon monoxide (CO) or mixtures of these.

22. The process for the operation of a fuel cell (SOFC) as claimed in claim 19, the heat-exchange gas introduced by the one or more third slits, mixed with the air and/or oxygen ($O_2$) originating from the upstream side of the second region, being chosen from air, air not depleted in oxygen, oxygen or mixtures of these.

* * * * *